United States Patent
Nye et al.

(10) Patent No.: US 11,662,704 B1
(45) Date of Patent: *May 30, 2023

(54) MONITORING REMOVAL OF AN AUTOMATION CONTROL PANEL

(71) Applicant: Vivint, Inc., Provo, UT (US)

(72) Inventors: James E. Nye, Alpine, UT (US); Jungtaik Hwang, Draper, UT (US)

(73) Assignee: VIVINT, INC., Provo, UT (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/027,168

(22) Filed: Jul. 3, 2018

Related U.S. Application Data

(63) Continuation of application No. 14/192,515, filed on Feb. 27, 2014, now Pat. No. 10,018,981.

(60) Provisional application No. 61/790,021, filed on Mar. 15, 2013.

(51) Int. Cl.
 G05B 19/048 (2006.01)
 G05B 15/02 (2006.01)

(52) U.S. Cl.
 CPC .......... *G05B 19/048* (2013.01); *G05B 15/02* (2013.01); *G05B 2219/23043* (2013.01); *G05B 2219/25097* (2013.01)

(58) Field of Classification Search
 CPC ..................................................... G05B 19/48
 USPC ........................................................ 700/79
 See application file for complete search history.

(56) References Cited

U.S. PATENT DOCUMENTS

| | | | | |
|---|---|---|---|---|
| 3,974,492 A | * | 8/1976 | Girismen | G08B 13/1409 340/635 |
| 5,051,724 A | * | 9/1991 | Morrow | E05B 19/0005 200/61.66 |
| 5,434,558 A | * | 7/1995 | Zeder | G08B 13/1409 200/51.1 |
| 5,578,991 A | * | 11/1996 | Scholder | G06F 21/35 340/571 |
| 5,757,271 A | * | 5/1998 | Andrews | G08B 13/1418 340/539.1 |
| 5,867,095 A | * | 2/1999 | Klein | G08B 29/043 340/506 |
| 6,114,955 A | | 9/2000 | Brunius et al. | |
| 6,414,958 B1 | | 7/2002 | Specht | |

(Continued)

FOREIGN PATENT DOCUMENTS

WO 2012166915 A1 12/2012

*Primary Examiner* — James D. Rutten

(74) *Attorney, Agent, or Firm* — Kunzler Bean & Adamson

(57) ABSTRACT

A control panel is used to control and/or monitor an automation system. The control panel may be removed from a mounted location to repair or replace the control panel. Replacement may be performed by a different provider of automation systems, potentially without prior notice to the current provider of the automation system. To alert the provider of the replacement, the control panel may use an anti-tamper switch to detect removal from the mounted location. A signal may be sent to a remote service system indicating the removal. If the control panel also loses AC power, or if the control panel loses all power, the remote service system may assume that the control panel is being replaced. In response, the remote service center may request that a customer service representative contact the customer to potentially retain the customer, recover equipment, or resolve any concerns about the automation system equipment.

20 Claims, 9 Drawing Sheets

(56) References Cited

U.S. PATENT DOCUMENTS

| | | |
|---|---|---|
| 6,441,723 B1 | 8/2002 | Mansfield et al. |
| 8,035,510 B2 | 10/2011 | Pfafman et al. |
| 8,368,532 B2 * | 2/2013 | Foisy .................. G08B 25/014 |
| | | 340/529 |
| 8,493,202 B1 | 7/2013 | Trundle et al. |
| 8,643,486 B2 | 2/2014 | Hess |
| 9,250,267 B1 | 2/2016 | Jackson et al. |
| 2001/0010032 A1 | 7/2001 | Ehlers et al. |
| 2002/0055790 A1 * | 5/2002 | Havekost ............. G05B 23/027 |
| | | 700/80 |
| 2003/0071728 A1 | 4/2003 | McDonald et al. |
| 2003/0151510 A1 * | 8/2003 | Quintana ........... G08B 13/1445 |
| | | 340/568.2 |
| 2004/0041703 A1 | 3/2004 | Bergman et al. |
| 2004/0190684 A1 * | 9/2004 | Urban ..................... H04Q 1/20 |
| | | 379/9 |
| 2005/0071093 A1 | 3/2005 | Stefan |
| 2007/0049213 A1 | 3/2007 | Tran |
| 2007/0233323 A1 | 10/2007 | Wiemeyer et al. |
| 2008/0118039 A1 * | 5/2008 | Elliot ...................... H04L 12/66 |
| | | 379/45 |
| 2010/0097208 A1 | 4/2010 | Rosing et al. |
| 2010/0281312 A1 * | 11/2010 | Cohn ..................... G08B 25/08 |
| | | 714/49 |
| 2011/0307203 A1 | 12/2011 | Higgins et al. |
| 2012/0050052 A1 | 3/2012 | Groves |
| 2012/0124418 A1 | 5/2012 | Liu et al. |
| 2012/0188072 A1 | 7/2012 | Dawes et al. |
| 2012/0290106 A1 * | 11/2012 | Halt ....................... G07C 5/008 |
| | | 700/79 |
| 2013/0049949 A1 * | 2/2013 | Blum .................... G08B 29/02 |
| | | 340/506 |
| 2013/0207802 A1 * | 8/2013 | Wu ........................ G08B 25/10 |
| | | 340/528 |
| 2015/0229626 A1 | 8/2015 | Hauhn |
| 2016/0042620 A1 * | 2/2016 | Dandie ............... G06F 11/3438 |
| | | 340/568.3 |

* cited by examiner

MONITORING REMOVAL OF AN AUTOMATION CONTROL PANEL

CROSS-REFERENCE TO RELATED APPLICATIONS

This application is a continuation of U.S. patent application Ser. No. 14/192,515, filed Feb. 27, 2014, titled: "Monitoring Removal of an Automation Control Panel," which claims priority to U.S. Provisional Patent Application No. 61/790,021, filed Mar. 15, 2013, titled: "Methods for Monitoring Removal of an Automation Control Panel, and Systems and Devices Related Thereto," the disclosures of which are incorporated herein by this reference.

TECHNICAL FIELD

The present disclosure relates to automation systems. More particularly, embodiments of the present disclosure relate to monitoring removal of a control panel of an automation system. More particularly still, embodiments of the present disclosure relate to detecting when a control panel of an automation system is removed, and determining the reason for the removal and potentially recovering the removed equipment.

BACKGROUND

People are increasingly interested in providing security to a building. Security in a home setting may be particularly significant for a home owner or resident who is away from home, who has small children, or who keeps valuable items at the home. For such an owner or resident to feel secure, security and privacy may be provided through various security mechanisms. Example methods include using door and window locks, the use of video security cameras, or intrusion detection security systems. Some or all of these components may be automated, and potentially included as part of an automation system associated with one or more other functions.

In general, an automation system may include multiple sensors that can detect particular events, and potentially control different devices. A door or window lock may include a sensor to detect an unauthorized entry, a window being broken, or the like. Other sensors may detect a water leak, and potentially shut-off a water supply in response. Other sensors may detect smoke or carbon monoxide, control lighting or heating elements, or have other purposes or capabilities.

A control panel may provide centralized control of the automation system and its various components or systems. If a security-related or other event is detected by the automation system, information about the event can be relayed to the control panel. The control panel may take appropriate action, such as sounding an alarm, deactivating or activating another portion of the automation system, or displaying information on a display of the control panel. The control panel may also send a message or information to an emergency responder, a network monitoring system, or some other remote system. The control panel may also be used, either on its own initiative or in response to communication from a remote location, to cause a sensor or system component to take a specified action.

A service provider associated with an automation system may make a significant investment in each automation system that is installed and used. Often, the service provider may pay for all or some of the labor costs associated with installation of an automation system, as well as some or all of the costs for equipment (e.g., control panel, window and door sensors, cameras, HVAC controllers, door locks, water monitors, carbon monoxide detectors, etc.). The service provider may be paid for continued use of the service and system as a way to recoup the investment over time.

SUMMARY

In accordance with aspects of the present disclosure, embodiments of methods, systems, software, control panels, computer-readable media, and the like are described or would be understood and which relate to security systems and other types of automation systems. In accordance with some embodiments of the present disclosure, a security or automation system may be used in connection with a control panel. If the control panel is removed from an installed location, or has power cut-off, a remote service system may be notified. Based on removal and/or loss of power, the remote service system may determine that there may be a problem with the control panel, that someone is tampering with the control panel, or that the control panel is being replaced. A customer service representative may then contact the customer to determine the reason for the removal and/or loss of power, and to see what can be done to remedy any concerns.

In example systems and methods, a service system that is remote from the control panel may receive a signal indicating the control panel has been removed. The service system may attempt to communicate with the control panel to determine whether power has also been lost. A response may be received. The response may indicate some power has been lost. For instance, AC power to the control panel may be lost; however, backup DC power may have remained available for the control panel to send the signal. In other cases, no response may be received. In that case, the service system may assume all power has been lost. When some or all power has been lost at the control panel, the remote service center may initiate a service call to have a representative contact the customer and determine the cause for the removed control panel and/or loss of power. A retention representative may make the contact as it may be determined that the removal and loss of power is likely due to replacement of the automation system by a competitive automation system. The retention representative may make contact within hours, minutes, or even seconds of determining the control panel has been removed and/or lost power.

If the customer is replacing the automation system, the retention specialist may attempt to retain the customer. If the signals are the result of some other action, the retention specialist may make that determination and provide a remedy, if available.

In accordance with some embodiments, a control panel that detects removal from a mounted location may detect a loss of some or all power prior to sending a signal to a remote service center, or prior to receiving a communication from the remote service center. The control panel may therefore be configured to automatically test both location (e.g., whether mounted to a mounting plate) and power (e.g., whether AC power is present) even in the absence of a request from a remote service system.

Some embodiments of the present disclosure relate to a control panel usable in testing location and/or power. In an example embodiment, a control panel may include an anti-tamper switch or sensor to detect location, and a power sensor to detect whether AC or other power is present. If the control panel is removed from a mounting plate, a wall, a bracket, or some other location or device, the anti-tamper switch may initiate a communication to a remote service provider. The power sensor may similarly detect whether AC, DC, or other power has been lost, and allow such information to be communicated to the remote service system.

Embodiments of the present disclosure further relate to automation systems including components and systems as described herein. Example automation systems may include a control panel connected to multiple automation components. Such automation components may optionally be encrypted or otherwise secured. Additional embodiments relate to a remote service system. An example remote service system may include a network operations center, a monitoring system, or some back-end or other service provider. The remote service system may include one or more computing systems to receive electronic communications from a control panel and potentially to send electronic communication to a control panel. The remote service system may further be capable of sending electronic or other communications to customer service representatives, or computing devices of customer service representatives, requesting contact be made with a customer in response to signals received from the control panel of the customer.

Other aspects, as well as the features and advantages of various aspects, of the present disclosure will become apparent to those of ordinary skill in the art through consideration of the ensuing description, the accompanying drawings and the appended claims.

BRIEF DESCRIPTION OF THE DRAWINGS

In order to describe the manner in which features and other aspects of the present disclosure can be obtained, a more particular description of certain subject matter will be rendered by reference to specific embodiments which are illustrated in the appended drawings.

Understand these drawings depict only typical embodiments and are not considered to be limiting in scope, nor drawn to scale for all embodiments. Various embodiments will be described and explained with additional specificity and detail through the use of the accompanying drawings in which.

DETAILED DESCRIPTION

Systems, devices and methods of the present disclosure are configured for use in connection with residential and/or commercial buildings, or with other locations which may use an automation system. Without limiting the scope of the present disclosure, a home or business may have a security system installed to monitor use of the building, including entry into the home through a door, window, or other similar entry point. Sensors at the entry point may detect when the entry point is open, closed, or broken (e.g., a window broken) and may respond in different ways in response to a change in status. For instance, when the security system is armed, an alarm may sound if a door or window is opened. Optionally, police or security may be contacted to request they monitor the building. Of course, other types of components within the automation system may result in other responses. For instance, if a leak in a water pipe or sprinkler system is detected, a response may include shutting off a valve. If no one is detected in a particular location, lighting may be turned off or dimmed.

Figure 1:
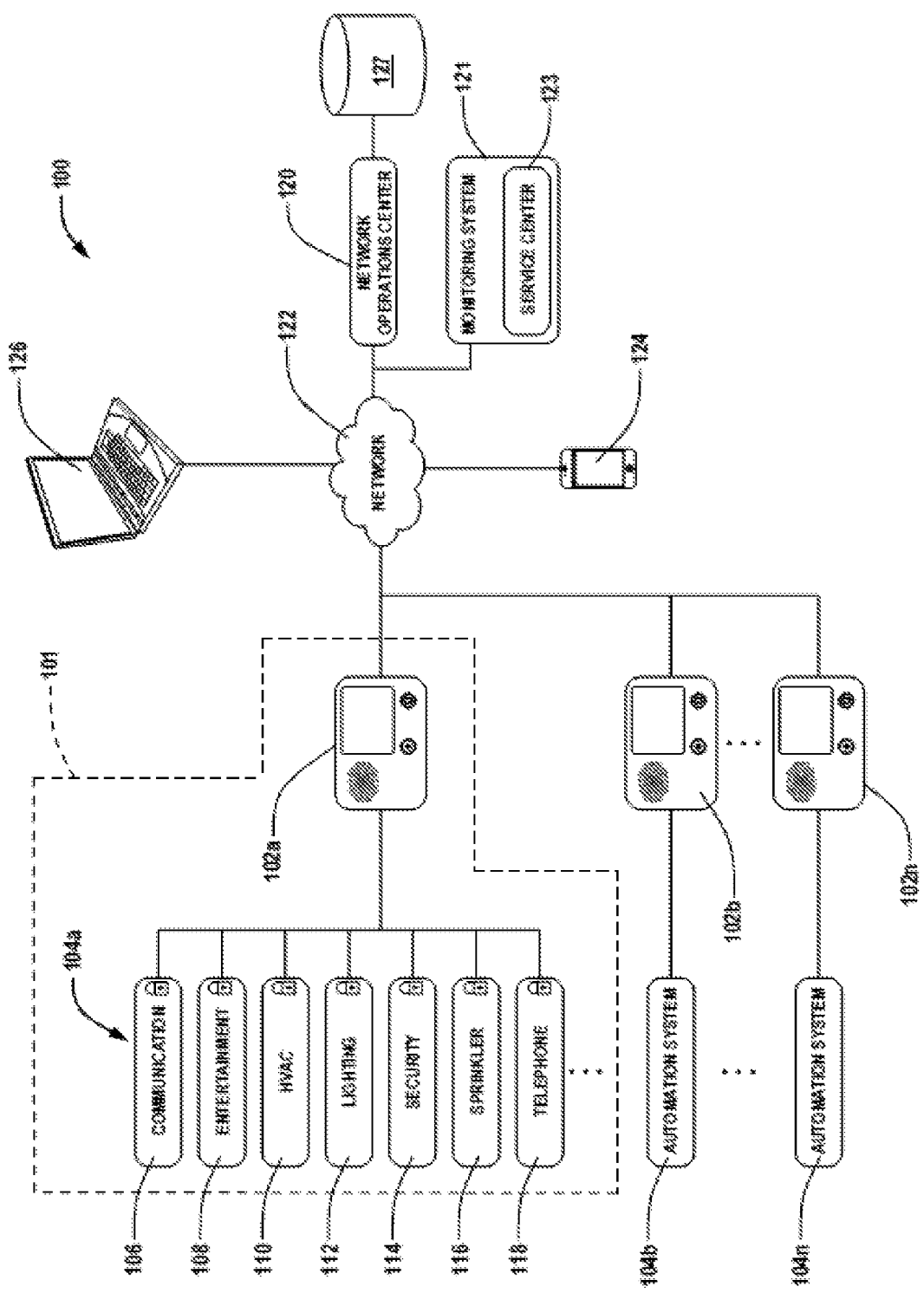
FIG. 1 is a schematic illustration of an exemplary automation system according to one embodiment of the present disclosure.

Turning now to FIG. 1, an example distributed system 100 is illustrated for allowing automating a physical location 101 (e.g., a home, office, etc.). The distributed system 100 may generally represent, or include, an automation system 104*a* associated with the location 101. As part of such a distributed system 100, a control panel 102*a* may be used. The control panel 102*a* may, but need not necessarily, be located at the location 101 being monitored or controlled. For instance, in FIG. 1, the control panel 102*a* is located within the location 101 where other components of the automation system 104*a* are also located. Certain aspects of the distributed system 100, or the automation system 104*a*, may be administered through the control panel 102*a*, or the control panel 102*a* may provide users with information about a status of the automation system 104*a*.

The automation system 104*a* may generally be referred to herein as a "security system," but need not be limited to security-related features. Indeed, the automation system 104*a* of the illustrated embodiment may include a number of different components, any or all of which may be used in connection with the control panel 102*a*. In this particular embodiment, for instance, the automation system 104*a* includes a communications system 106, an entertainment system 108, a heating, ventilation, and air conditioning ("HVAC") system 110, a lighting system 112, a security system 114, a sprinkler system 116, and a telephone system 118. Additional or other systems or components may also be included and monitored or controlled using the control panel 102*a*.

Any or all of the systems 106-118 may include sensors, controllers, valves, switches, or other components, or any combination thereof. Such components may be controlled or set using the control panel 102*a*, may be monitored using the control panel 102*a*, may communicate with each other or the control panel 102*a*, or may have additional or other capabilities. Such components, which generally monitor or control some aspect of the location 101, may generally be referred to herein as "automation components" and may perform a variety of functions. For instance, a set of one or more automation components may be integrated as part of the security system 114 associated with the location 101. In some embodiments, the automation components of the security system 114 may include sensors that detect intruders (e.g., unauthorized opening of a door or window, breakage of a window, motion sensors, etc.), sensors that detect smoke or fire, or some other security-related component or a combination thereof. In some embodiments, the security system 114 may include automation components such as cameras which obtain still or video images of one or more locations.

The automation components of the systems 106-118 may include any number of capabilities and functions. In one embodiment, for instance, the automation components may be encrypted or secured to restrict the ability to intercept communications, to use the automation components with un-approved devices, or for any number of other reasons. FIG. 1 illustrates an example in which each of the systems 106-118 may be secured, as indicated by the lock on each system. In at least one embodiment, some or all automation components of each system 106-118 may be encrypted, to thereby encrypt communications, encrypt an address or identification associated with the automation component, or the like. The control panel 102a may have suitable public/private keys or other decryption components to communicate with the encrypted automation components. If an unauthorized replacement control panel is provided, however, such a control panel may be unable to communicate with the corresponding automation components of the systems 106-118, unable to obtain address/device information, or unable to understand communications. In some embodiments, such as where the systems 106-118 operate using a mesh network, encryption of automation components may allow some or all automation components to communicate, and each automation component may optionally include encryption capabilities to encrypt or otherwise secure its own communications, to decrypt or interpret secured communications of other automation components or the control panel 102a, or other capabilities, or some combination thereof.

Automation components of the automation system 104a may take any number of forms, and are not limited to security components. For instance, automation components may include entertainment components such as televisions, recordable media players (e.g., DVD player, Blu-Ray Player, digital video recorders, VCR, set-top box, etc.), projectors, speakers, stereos, and the like, any or all of which may be separate from the control panel 102a. Such entertainment components may be used, by way of example only, to turn on a television, radio, optical disk player, or the like, change a channel or volume of television or radio, or for other purposes. In the same or other embodiments, automation components may include thermostats, air conditioners, furnaces, temperature sensors, and the like, or controllers therefor. Monitored and/or controllable automation components may further include lighting system components such as light fixtures, switches, motion sensors, etc. to monitor the status of lights and/or to turn lights on or off. Additional components or controllers, or may include security system components including sensors or detectors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.), video or still cameras, speakers, microphones, or other components. In embodiments where the automation system 104a includes a sprinkler system 116, the automation components may include valves, actuators, sensors (e.g., flow rate sensors, proximity sensors, etc.), sprinklers, pumps, and the like. In a similar manner, where one or more of the automation components is part of a telephone system 118, the automation components may include telephones, answering machines, call forwarding components, intercoms, and the like. Some or all of the automation components of the various systems 106-118 may also include wireless communication system components. As an example, the automation components may include routers, switches, access points, repeaters, bridges, and the like.

When a given condition occurs at a monitored automation component, the control panel 102a may cause other automation components to respond. Additionally, or alternatively, the control panel 102a may communicate with components, including those remote from the physical location. As an example, upon monitoring the automation components of the systems 106-118, the control panel 102a can detect changes in status, which changes may correspond to events. For instance, as discussed herein, if the security system 114 includes an automation component at a door, the control panel 102a may detect when the door is open or closed, or when the status of the door changes. If the security system 114 is armed, opening of the door may trigger an event indicating a potential intruder has entered the building. The control panel 102a may be programmed to respond accordingly. For instance, the security system 114 may also include an alarm automation component. The control panel 102a may turn on the alarm of the alarm automation component. Of course, the control panel 102a may also perform other actions, including initiating a phone call to the police or security (e.g., using the telephone system 118 or a radio component built into the control panel 102a). In the event of another type of event—whether detected using the security system 114 or another of the systems 106-118—the control panel 102a may facilitate taking of other actions.

In at least some embodiments, the control panel 102a may communicate with one or more third parties. For instance, FIG. 1 illustrates the control panel 102a as being in communication with a network operations center ("NOC") 120. Optionally, the control panel 102a may provide the NOC 120 with information about detected events. In some cases, the NOC 120 may then take actions. By way of illustration, if the control panel 102a notifies the NOC 120 that a potential intruder has entered a building, the NOC 120 may respond by notifying police or security. Consequently, some actions taken in response to a detected event may be taken by the NOC 120 rather than by the control panel 102a.

FIG. 1 also illustrates an example embodiment in which the control panel 102a is in communication with a monitoring system 121. The monitoring system 121 may include a back end service system or center through which events of the control panel 102a are monitored. The monitoring system 121 may potentially identify events and potential actions to take in response to an event. For instance, continuing with an example of a security system (e.g., security system 114), if an intruder is detected, the monitoring system 121 may determine when an alarm should sound at the location 101 and communicate with the control panel 102a to request the alarm.

In accordance with some embodiments of the present disclosure, the monitoring system 121 includes, or is associated with, a service center 123. The service center 123 may include computing devices and/or personnel who respond to events identified in any of numerous automation systems 104a-104n. In the example of a potential intruder at the location 101, the monitoring system 121 may receive some notice of the event and pass information about the event to the service center 123 (e.g., send an electronic message including information about the event, where the event is located, contact information for a user of the automation system 104a, etc.). The service center 123 may then reach-out to the user of the automation system 104a to ask if they need assistance, to alert them of what was detected, to contact emergency personnel, or for any number of other actions that can be automated or include human operator assistance. Although the monitoring system 121 is shown as being separate from the NOC 120, in other embodiments the NOC 120 may include some or all operations of the monitoring system 121. The service center 123 may also be included as part of the NOC 120, or separate therefrom, and can also be separate from the monitoring system 121.

To allow the NOC 120 and/or monitoring system 121 to be aware of detected events, and to potentially respond to such events, the control panel 102a may communicate with the NOC 120 or monitoring system 121 through a communications network 122. The communications network 122, which may carry electronic communications, may include the Internet, local area networks, wide area networks, virtual private networks ("VPN"), telephone networks, other communication networks or channels, or any combination of the forgoing. Thus, it should be understood that the communications network 122 may operate in any number of different manners, and can include different components, and may be distributed so as to include different components at different locations. For instance, the communications network 122 may include a wireless communication system such as that provided by a mobile phone provider. As an example, the control panel 102a may include a radio component to communicate with or using the communications network 122 through GSM, CDMA, LTE, HSPA+ or other similar technologies used by mobile phone systems. In other embodiments, other wireless systems or even wired communication may be used. Any combination of the foregoing may also be used.

Thus, while a single communications network 122 is illustrated, such a component may be illustrative of multiple devices or components. For instance, the communications network 122 may include multiple networks interconnected to facilitate communication.

Regardless of the particular type of protocols and systems used by the communications network 122, the NOC 120 or monitoring system 121 may receive information from the control panel 102a about events detected using automation components. In some embodiments, the NOC 120 includes human operators who monitor the events (e.g., where the NOC 120 includes the service center 123). Based on the type of event detected, the human operator may initiate some type of response. That response may be implemented using the control panel 102a by, for instance, sending information back to the control panel 102a, initiating voice communication through the control panel 102a, or in other manners. When implementing actions using the control panel 102a, the actions may be considered to be "in-band". In other embodiments, the human operator may initiate an "out-of-band" response. Such a response may include actions taken without use of the control panel 102a. For instance, after detecting an intruder, a phone call may be made to police or security to request that they monitor the location where the intruder was detected. A phone call could also be placed to the user or owner of the automation system 104a. As an example, the NOC 120 may place a call to a mobile device 124, send an email retrieved at the computing device 126, or otherwise initiate some communication or action.

While some responses may be taken or initiated by using a human operator, other responses may be automated. For instance, if a signal representative of a potential intruder alert is detected, the NOC 120 may automatically initiate an action, such as calling or otherwise communicating with the police, a home owner, or the like (e.g., text message, e-mail, emergency alert systems, etc.). The same or similar actions may be taken by a separate monitoring system in embodiments where the monitoring system 121 is present. The NOC 120 and/or monitoring system 121 may include computing devices to initiate such actions. In accordance with at least one embodiment, the NOC 120 and/or monitoring system 121 includes, or communicates with, a data store 127. The data store 127 may include information to allow a determination of what actions to take, what automation system is affected, who is the user of the particular automation system, and the like. Each event may, for instance, be associated with a different in-band and/or out-of-band action that can be taken, with such different actions being stored in the data store 127.

The NOC 120 or monitoring system 121 may optionally be used for other or additional purposes beyond responding to events detected by the automation system 104a. For instance, the NOC 120 or monitoring system 121 may be a central monitoring location for use with multiple control panels 102a-102n. Indeed, monitoring may be performed for any number of control panels 102a-102n, each of which may be connected to its own automation system 104a-104n. Further, the NOC 120 and/or monitoring system 121 may update software or firmware on the control panels 102a-102n, and to ensure that the control panels 102a-102n are operating and communicating properly with automation components of their respective automation systems 104a-104n and/or with the NOC 120 or monitoring system 121. As a result of such monitoring, when the automation components of an automation system 104a-104n detect a certain event (e.g., a security-related event such as a break-in, a fire, etc.), the control panel 102a-102n can obtain the information and optionally takes some prescribed action (e.g., initiating an alarm, performing a corrective action, notifying an administrator or user, etc.). The corresponding control panel 102a-102n may also communicate such information to the NOC 120 through the communications network 122 for review or action. In a similar manner, the monitoring system 121 may provide monitoring functionality for each of the control panels 102a-102n, as well as for their corresponding automation systems 104a-104n. The monitoring system 121 may communicate directly with the control panels 102a-102n through the communications network 122, or may communicate with the NOC 120 (e.g., directly, or through the communications network 122).

The distributed system 100 of the present disclosure may be implemented as a communication system in which the operations of various systems and components may be monitored through communication links. As discussed herein, such communication links may include wired or wireless links, or can include a combination of wired and wireless links, any or all of which may use different protocols or networks. Regardless of the particular mode of communication, the status or operation of devices and components can be reported to, or controlled using, the corresponding control panel 102a, NOC 120, monitoring system 121, or even other devices 124, 126. For instance, the devices 124, 126 may interact with the monitoring system 121 to monitor and/or control aspects of the automation systems 104a-104n. The NOC 120 and/or monitoring system 121 may, for instance, provide a remote access system. Using the remote access system, a user may use a browser or application on a computing device (e.g., computing device 126, mobile device 124) to interact with the NOC 120 or monitoring system 121, which can in turn communicate with the control panel 102a to monitor or control aspects of the automation system 104a. In other embodiments, a remote access system may be provided by, or in connection with, the control panel 102a, so that a remote computing device may communicate directly with the control panel 102a via the communications network 122.

The control panel 102a may be equipped to use one or more different communication protocols in communicating with automation components of the automation system 104a and with the communications network 122. Such communication protocols may be implemented using any combination of one or more of wired or wireless communication. As an example, automation components of the automation system 104a may operate using a wireless protocol, or system that allows a mesh network to be formed. Each automation component may, for instance, optionally be able to communicate with some or any other automation component, provided they are in range of each other. If the automation components use a wireless system for communicating with the control panel 102a, an automation component that is in range of the control panel 102a may also send information to, or receive information from, the control panel 102a. In some embodiments, the automation components may communicate with each other and the control panel 102a using the same communication protocol. Although not intended to limit the scope of the present disclosure, an example communication protocol for such an embodiment may be a low-power, short-range wireless communication protocol (e.g., Z-Wave, ZigBee, etc.). In other embodiments, larger range wireless communication protocols (e.g., WiFi, LightwaveRF, etc.) may be used in addition to, or instead of, the short-range alternatives. Such connections may also allow two-way communication or may provide only one-way communication.

The control panel 102a may also optionally communicate with the communications network 122 and/or the NOC 120 or devices 124, 126 using the same or other protocols. As an example, if the mobile device 124 is in sufficiently close physical proximity to the control panel 102a, a physical connection may be used, or a suitable wireless communication protocol (e.g., Z-Wave, ZigBee, Bluetooth, WiFi, etc.) may be used.

Communication with the communications network 122 may also be made in any suitable manner, including using wireless or wired communication, or a combination thereof. For instance, as discussed herein, an example control panel 102a may communicate with the communications network 122 operating on a mobile telephone system. A GSM, CDMA, LTE, HSPA+, or other similar wireless communication component may therefore be included in the control panel 102a and the communications network 122 to allow for such communication. In other embodiments, the communications network 122 may have other components to allow for alternative or additional types of communication between the communications network 122 and the control panel 102a. Moreover, a NOC 120 may communicate with different control panels 102a-102n of different automation systems 104a-104n using the same or different communication protocols, and potentially allow such control panels 102a-102n to communicate with each other.

Figure 2:
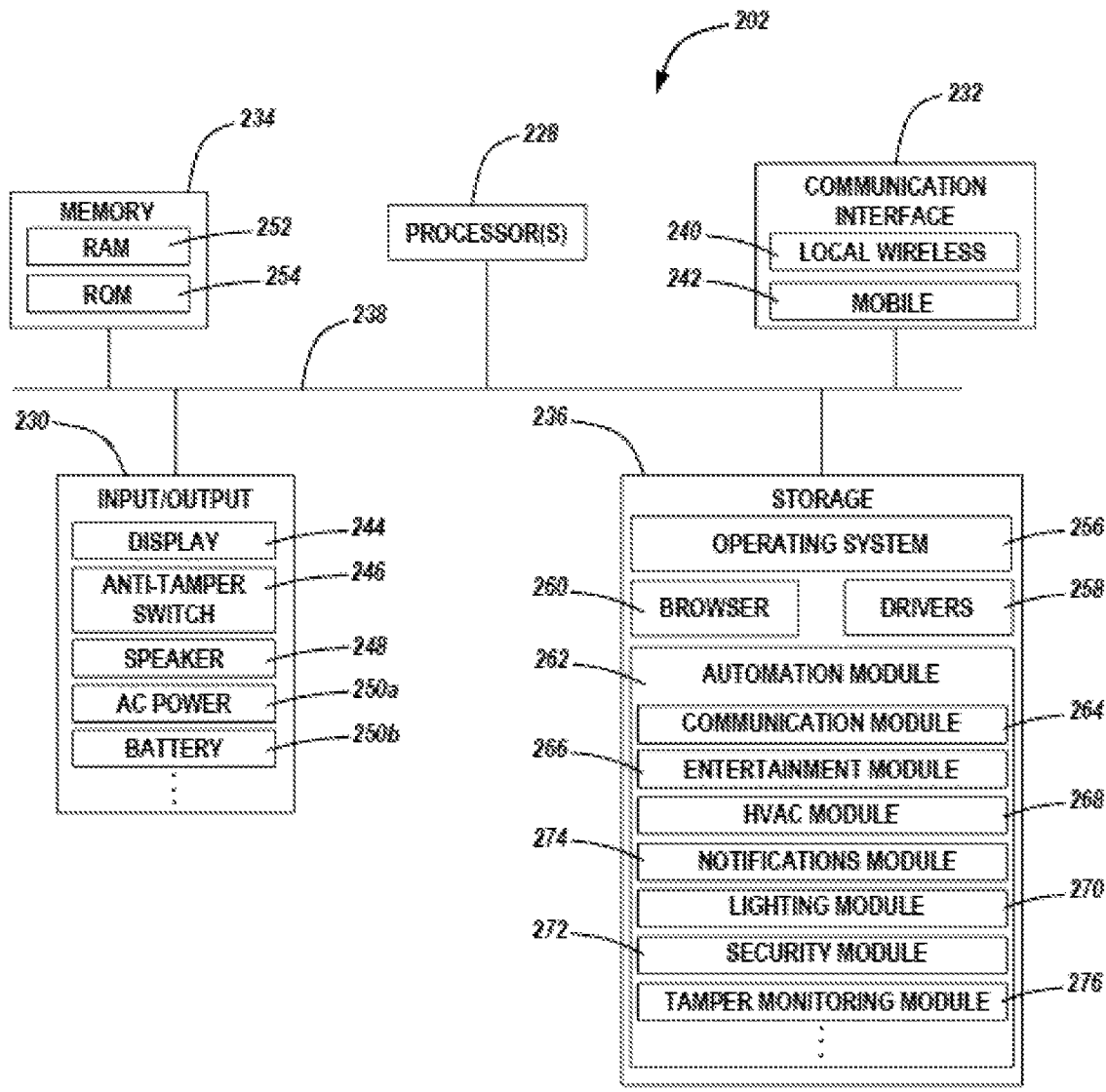
FIG. 2 is a schematic illustration of an exemplary control panel usable in an automation system, according to one embodiment of the present disclosure.

Turning now to FIG. 2, an example control panel 202 is schematically illustrated. It should be appreciated in view of the disclosure herein that the control panel 202 may be used in the distributed system of FIG. 1 or in connection with any of a variety of other systems. Further, the control panel 202 is merely illustrative, and a control panel of the present disclosure may have fewer or additional components, or elements other than those expressly described or illustrated, or may be used in connection with systems or components other than those of FIG. 1 or the methods, systems, and devices disclosed herein.

In FIG. 2, the control panel 202 includes multiple components interacting together over one or more communication channels. In this embodiment, for instance, one or more processors 228 may communicate with input/output devices 230, a communication interface 232, memory 234 and/or a mass storage device 236 via a communication bus 238. The processors 228 may generally include one or more processing components, including a central processing unit, a graphics processing unit, or the like, any of which may be capable of executing computer-executable instructions received or stored by the control panel 202.

The processors 228 may communicate with the communication interface 232 using the communication bus 238. The communication interface 232 may receive or send communications via one or more networks (e.g., communications network 122 of FIG. 1) or otherwise communicate with other components or devices (e.g., automation system 104a of FIG. 1). Received communications may be provided over the communication bus 238 and processed by the processors 228.

In the particular embodiment illustrated in FIG. 2, the communication interface 232 may include multiple components to allow communication via one or more different protocols. For instance, the illustrated embodiment includes a local wireless interface component 240 for connecting to local components, such as over a wireless mesh network. As discussed herein, an example of the local wireless interface component 240 may include radio which operates using Z-Wave, ZigBee, or other protocols, or some combination thereof. Such a component may specifically communicate with security or other automation system components for a residence or other structure, including one or more sensors, cameras, controllers, and the like. Further, while a single local wireless interface component 240 is shown in FIG. 2, such a component may include multiple elements, including antennas. In some embodiments, for instance, the local wireless interface component 240 may include multiple antennas to communicate with multiple automation components simultaneously, and potentially using any of a variety of different frequencies or channels.

In still another example embodiment, an example communication interface 232 may include a mobile interface component 242 for communicating over a mobile telephone network. An example network may include, for instance, GSM, CDMA, LTE, HSPA+, or other communication typically used by a wireless carrier to communicate with a mobile device such as a telephone or tablet computing device. As discussed herein, in one example embodiment, the mobile interface component 242 may be provided to facilitate communication between the control panel 202 and a network operations center (e.g., NOC 120 of FIG. 1) or remote service provider system (e.g., monitoring system 121 of FIG. 1).

In still another embodiment, the communication interface 232 may include other components. For instance, an example control panel 202 may send and/or receive communications over a wireless protocol such as WiFi (i.e., IEEE 802.11), Bluetooth, or some other protocol. The local wireless interface component 240 may, for instance, include WiFi or other similar capabilities. Moreover, according to some embodiments as disclosed herein, the interface component 240 may be configured to allow the control panel 202 to function as a wireless access point.

According to some embodiments, the control panel 202 may include one or more input/output devices 230. The input/output devices 230 may communicate with one or more processors 228 using the communication bus 238. Any suitable type of input/output device may be provided. For instance, the control panel 202 may include buttons, keypads, voice recognition components, or the like through which input is received from a user. A display 244 may also be provided and used as an output to display information to a user. In some embodiments, the display 244 may also act as an input. For instance, the display 244 may be a touch-sensitive display allowing a user to touch the display 244 to make a selection, to provide input through a gesture, or to otherwise provide input. Still other types of input or output devices may include an anti-tamper switch 246, audio output devices such as a speaker 248, power components (e.g., an AC power component 250a or battery power source 250b), ports, sensors, or other elements or some combination thereof. The input/output devices 230 of a control panel 202 are merely illustrative. In other embodiments, for instance, trackball, mouse, biometric reader (e.g., iris scanner, fingerprint reader, etc.), GPS device, or other component, or some combination of the foregoing, may be included.

The control panel 202 may also include memory 234 and mass storage device 236. In general, the memory 234 may include one or more of persistent and non-persistent storage, and in the illustrated embodiment the memory 234 is shown as including random access memory (RAM) 252 and read only memory (ROM) 254. Other types of memory or storage may also be included.

The mass storage device 236 may generally be comprised of persistent storage in any of a number of different forms. Such forms may include a hard drive, flash-based storage, optical storage devices, magnetic storage devices, or other forms which are either permanently or removably coupled to the control panel 202. In some embodiments, an operating system 256 defining the general operating functions of the control panel 202, and which is executed by the processors 228, may be stored in the mass storage device 236, although all or a portion of the operating system 256 may alternatively be stored in the memory 234. Other components stored in the mass storage device 236 may include drivers 258 (e.g., to facilitate communication between the processors 228 and the input/output devices 230 and/or components of the communication interface 232), a browser 260 (e.g., to access or display information obtained over a network, including mark-up pages and information), and application modules.

Application modules may generally include any module, program, or application that may be used in the operation of the control panel 202. Examples of application modules may include programs specifically designed for use with a security and/or automation system (e.g., automation module 262), or more general use programs, applications, or modules. Examples of more general use applications can include word processing applications, spreadsheet applications, games, calendaring applications, weather forecast applications, sports scores applications, and other applications.

As shown in FIG. 2, in at least one embodiment, an automation module 262 may include, or operate in connection with, additional modules or components capable of being used by the control panel 202 in connection with a security or automation system. For instance, the automation module 262 may include an additional communication module 264. The communication module 264 may generally control or monitor how one or more communication systems of a residence or commercial building operate. As an example, an intercom system may be provided at an entry to the building, and the communication module 264 may monitor its use and potentially be used in passing communications (e.g., using a speaker or sending communications to a remote device). The communication module 264 may similarly be configured to facilitate visual communications (e.g., using one or more cameras and/or visual display devices). Moreover, the communication module 264 may determine when to allow communication.

The automation module 262 may also include an optional entertainment module 266, HVAC module 268, and lighting module 270. The entertainment module 266 may generally monitor and/or control entertainment-related devices and functions of a location. For instance, the channel or volume of a television may be monitored and potentially changed using the control panel 202. The HVAC module 268 may generally monitor or control heating or air conditioning components. For instance, if the temperature in a location is higher or lower than desired, the HVAC module 268 may control a thermostat to obtain a more comfortable temperature. Similarly, the lighting module 270 may monitor, control or otherwise interface with lighting components including switches, lighting fixtures, and the like. In some embodiments, such as where a light is provided at an entry way, the lighting module 270 may interface with sensors to detect the presence of a person (e.g., a motion sensing light). The lighting module 270 may also perform other functions (e.g., automatically turn on a light in response to a trigger event).

The modules 272-276 may provide additional, and potentially similar functions. For instance, the security module 272 may interface with security-based automation components, such as sensors (e.g., motion sensors, magnetic sensors, intrusion sensors, vibration sensors, infrared sensors, ultrasonic detectors, microwave detectors, contact sensors, photoelectric beam detectors, smoke detectors, temperature sensors, carbon monoxide detectors, etc.). When an event is detected, the security module 272 may determine how the control panel 202 should respond to the event, what communications to send to a NOC or other remote location, or what other actions to take.

The notifications module 274 may have other functions. For instance, in response to some events, it may be desirable to provide information to a remote or other third party. As an example, a NOC or other remote service provider may be sent information about an event. The remote system may then respond to the control panel 202 for some in-band action, or take other actions out-of-band. Therefore, in some embodiments, the notifications module 274 may collect information from one or more other modules or automation components and prepare a report or notification on events, the status of automation components, or the like. Such a report may be prepared periodically or in response to a particular event. In one embodiment, an event may trigger a report by the notifications module 274, which can then use the communication interface 232 to send the report to a NOC or other remote system.

The notifications module 274 may also be used for other functions. As discussed herein, a control panel 202 may also receive information from one or more sources. Such sources may include automation components, and the notifications module 274 may collect, store, and potentially report on received information. The notifications module 274 may also receive information from a NOC or other similar location or service provider. As an example, a NOC may send information requesting that the control panel 202 take a particular action (e.g., turn on an alarm). The notifications module 274 may receive the information and then distribute the information to an appropriate module (e.g., security module 272) or automation component. In still another embodiment, information that is received may be displayed or otherwise output using the input/output devices 230.

The automation module 262 may also include other components or modules, including a tamper monitoring module 276. In at least some embodiments, the tamper monitoring module 276 may detect when a user or other person or entity is attempting to remove, damage, replace, or otherwise tamper with the control panel 202. For instance, the tamper monitoring module 276 may monitor the anti-tamper switch 246 of the input/output devices 230. When the anti-tamper switch 246 is activated, the tamper monitoring module 276 may determine what action to take, and can potentially interact with the notifications module 274 to communicate the event to a NOC or other remote service provider. In some embodiments, the tamper monitoring module 276 may monitor other components in addition to, or instead of, the anti-tamper switch 246. For instance, as discussed herein, a person removing the control panel from a mounting surface may remove the control panel's 202 access to a power source. In one embodiment, the tamper monitoring module 276 may therefore also monitor the AC power component 250a, the battery power source 250b, or some other component usable to provide power to the control panel 202.

The foregoing description and the modules shown in FIG. 2 are purely provided to illustrate the variety of different types of modules, programs, or applications that may be included, and are not intended to be an exclusive list. In other embodiments, for instance, additional modules may include a remote access module. Such a module could, for instance, enable the control panel 202 to be directly accessed using remote devices (e.g., devices 124, 126 of FIG. 1), and to potentially have communications relayed through the control panel 202 either to or from the remote devices. In other embodiments, however, remote access may be enabled through a web portal, NOC, monitoring system, or other system, and managed by the remote access module. Thus, a user of a remote device could potentially set or view communications, door cameras, entertainment, lighting, security, HVAC, sprinkler, telephone, or other settings remotely, or even receive or otherwise monitor audio or video feeds from a remote location.

The automation module 262 may also include additional or other modules or components, including modules not shown in FIG. 2. For instance, the automation module 262 may include a sprinkler system module (e.g., to verify water flow rates at one or more locations, turn sprinklers on or off, etc.), a telephone module (e.g., to interface with a telephone system and potentially run telephone calls through the control panel, to forward calls, etc.), an updating module (e.g., to pull or request software updates), and the like. In other embodiments, modules may be included and which relate to authentication, settings, preferences, encryption/decryption, an emergency override, or other modules.

Turning now to FIGS. 3A-3D, an example control panel 302 is illustrated in additional detail. The control panel 302 may include some or all of the components or capabilities of the control panels described relative to FIGS. 1 and 2, or may include still other or additional features. The particular control panel 302 is illustrated to describe one mechanism for preventing or restricting unwanted tampering with the control panel 302, but other anti-tampering mechanisms or systems may also be used.

Figure 3A:
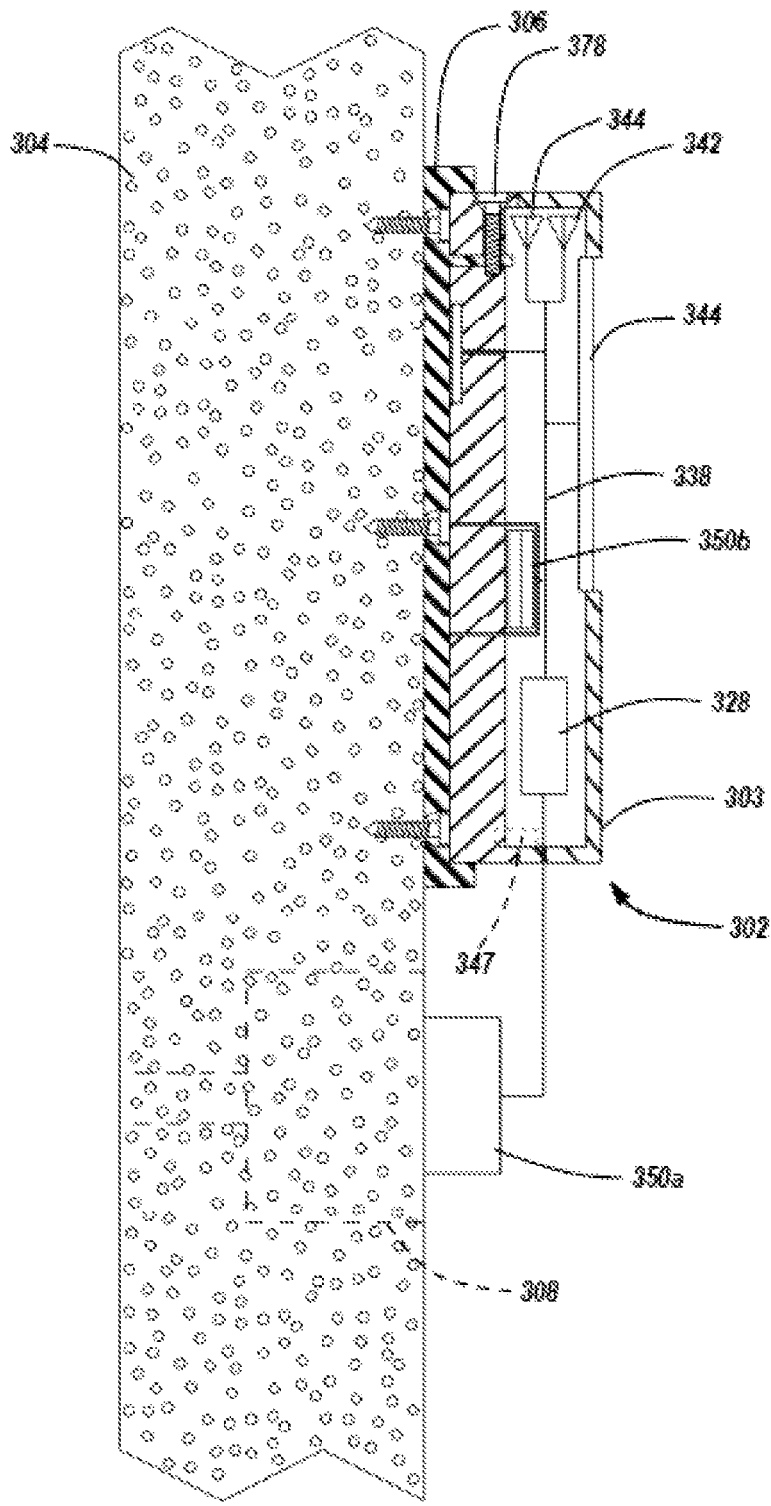
FIG. 3A illustrates a cross-sectional view of an exemplary control panel mounted to a wall or other mounting surface, with some components of the control panel schematically illustrated, according to one embodiment of the present disclosure.

In the particular embodiment shown in FIG. 3A, a control panel 302 is shown as being mounted to a mounting surface, such as the wall 304, using a mounting plate 306. In this particular embodiment, the mounting plate 306 has a rear surface that engages or connects to an exterior surface of the wall 304. A frontal surface of the mounting plate 306 may then connect to a body 303 of the control panel 302.

The control panel 302 may include a variety of components or features, some of which are schematically illustrated in FIG. 3A. In particular, the control panel 302 may include one or more interface components, such as a display 348. Using the display 348, information may be communicated about the control panel 302 and/or a connected automation system. Other interface features, including speakers, buttons, ports, and the like are omitted to avoid unnecessarily obscuring aspects of the disclosure, but may also be included in the control panel 302.

The control panel 302 may communicate with local automation components and/or remote service providers using one or more antennas 342, 344. In some embodiments, a set of one or more antennas 342, 344 may communicate with local automation components within an automated location. Example systems and protocols are discussed herein, and may include, but are not necessarily limited to, use of wireless mesh network protocols. The antenna 344 may also communicate with local automation components. In other embodiments, however, the antenna 344 includes one or more antennas to communicate with a remote service provider. The antenna 344 may also include components or features described herein, including features and components for communicating using a mobile phone communications network or other wireless or wired communication network.

Additional features of the control panel 302 may include a controller 328. The controller 328 may include one or more processors and/or other components for operating the control panel 302. In one embodiment, the controller 328 may include a printed circuit board or other similar component, along with storage devices, processors, and the like. Such a controller 328 may interpret signals received via the antennas 342, 344, input received via the display 348 or other input/output components, or to send signals to the same or similar components. A communication link 338 may be connected to the controller 328 to allow such communication among the various components of the control panel 302.

One or more power supplies may be provided to allow the controller 328, display 348, antennas 342, 344, and other components to operate. Any of a number of power supplies may be used. In this particular embodiment, the control panel 302 includes an AC power supply 350a and a DC power supply 350b.

More particularly, the AC power supply 350a of the illustrated embodiment may include a plug or other connector configured to connect to an AC power source. In this particular embodiment, the AC power source may include an outlet 308 in the wall 304, although an outlet 308 may be located in any suitable location. The DC power supply 350b of the illustrated embodiment may include a DC voltage source such as a battery or set of batteries. The DC power supply 350b is shown as embedded within the body 303 of the control panel 302, although such a power supply may be removable. In some embodiments, the DC power supply 350b and AC power supply 350a may each power some components of the control panel 302. In other embodiments, the one of the DC power supply 350b or AC power supply 350a may provide primary power to all or some components, while the other may act as a backup power source. For instance, the AC power supply 350a may be the primary power source; however, the DC power supply 350b may provide power in the event the AC power supply 350a is unplugged, damaged, disconnected, or otherwise fails to provide the necessary power.

Figure 3B:
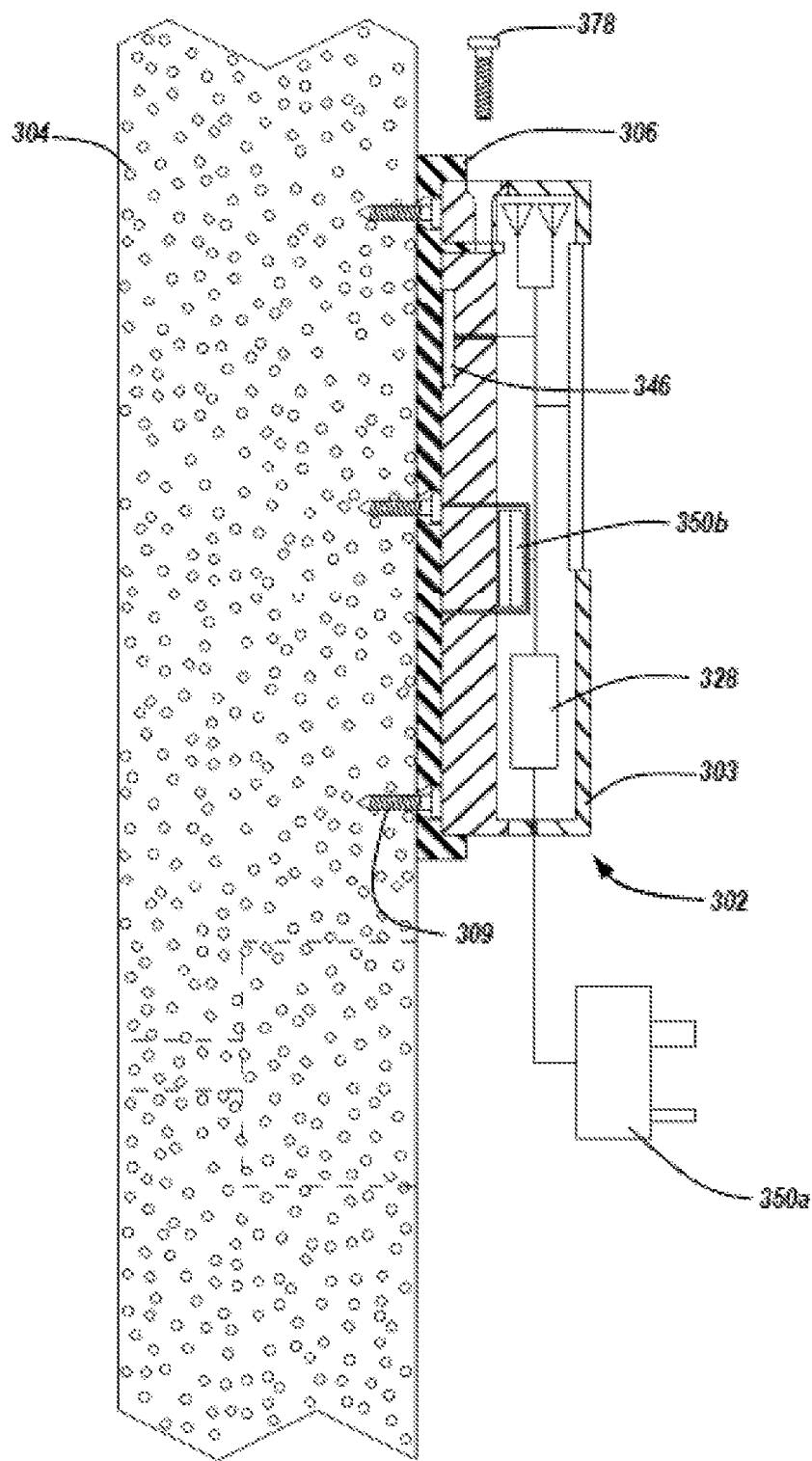
FIGS. 3B-3D illustrate cross-sectional views of the control panel of FIG. 3A in various stages of removal from the mounting surface, in accordance with some embodiments of the present disclosure.
Figure 3C:
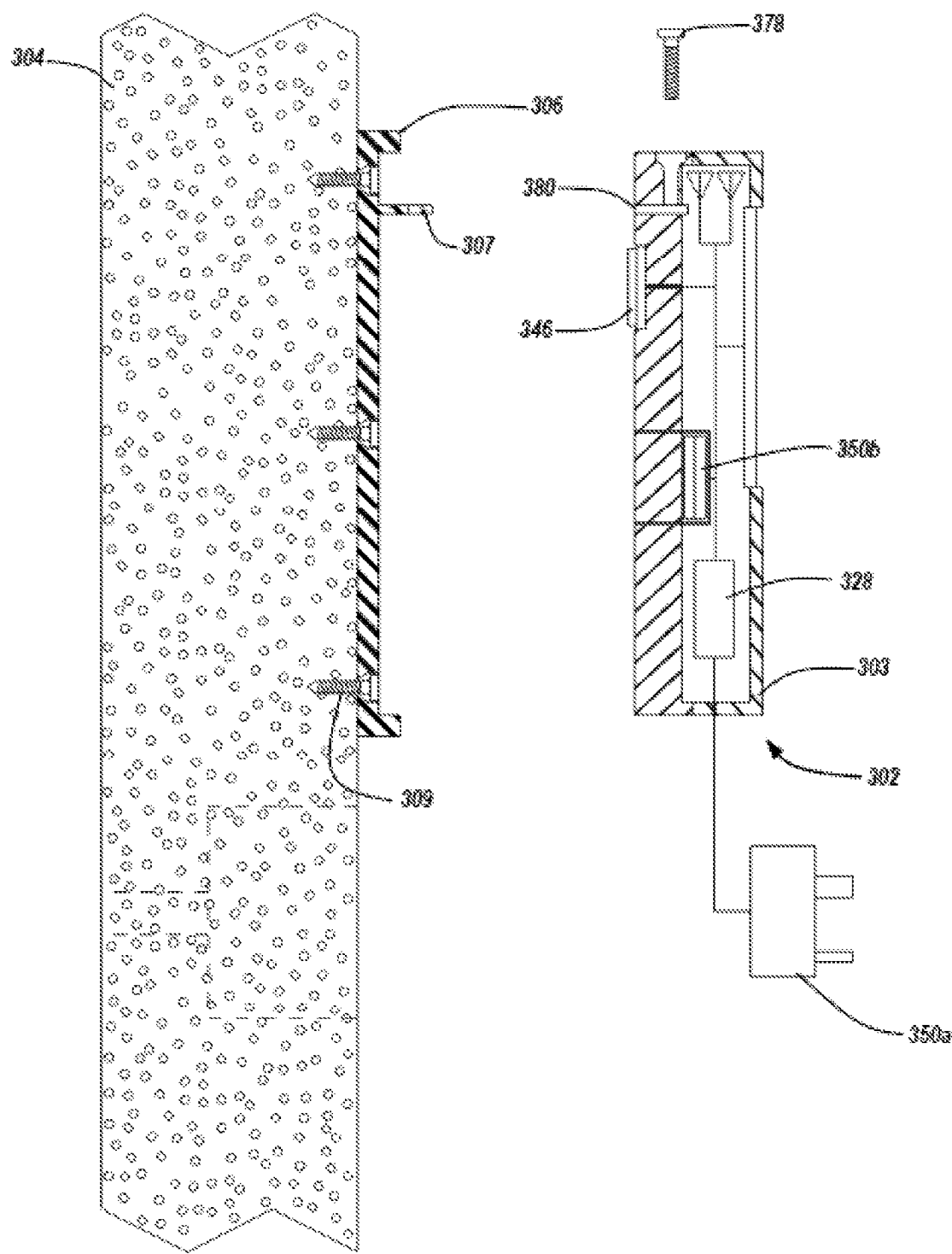
Figure 3D:
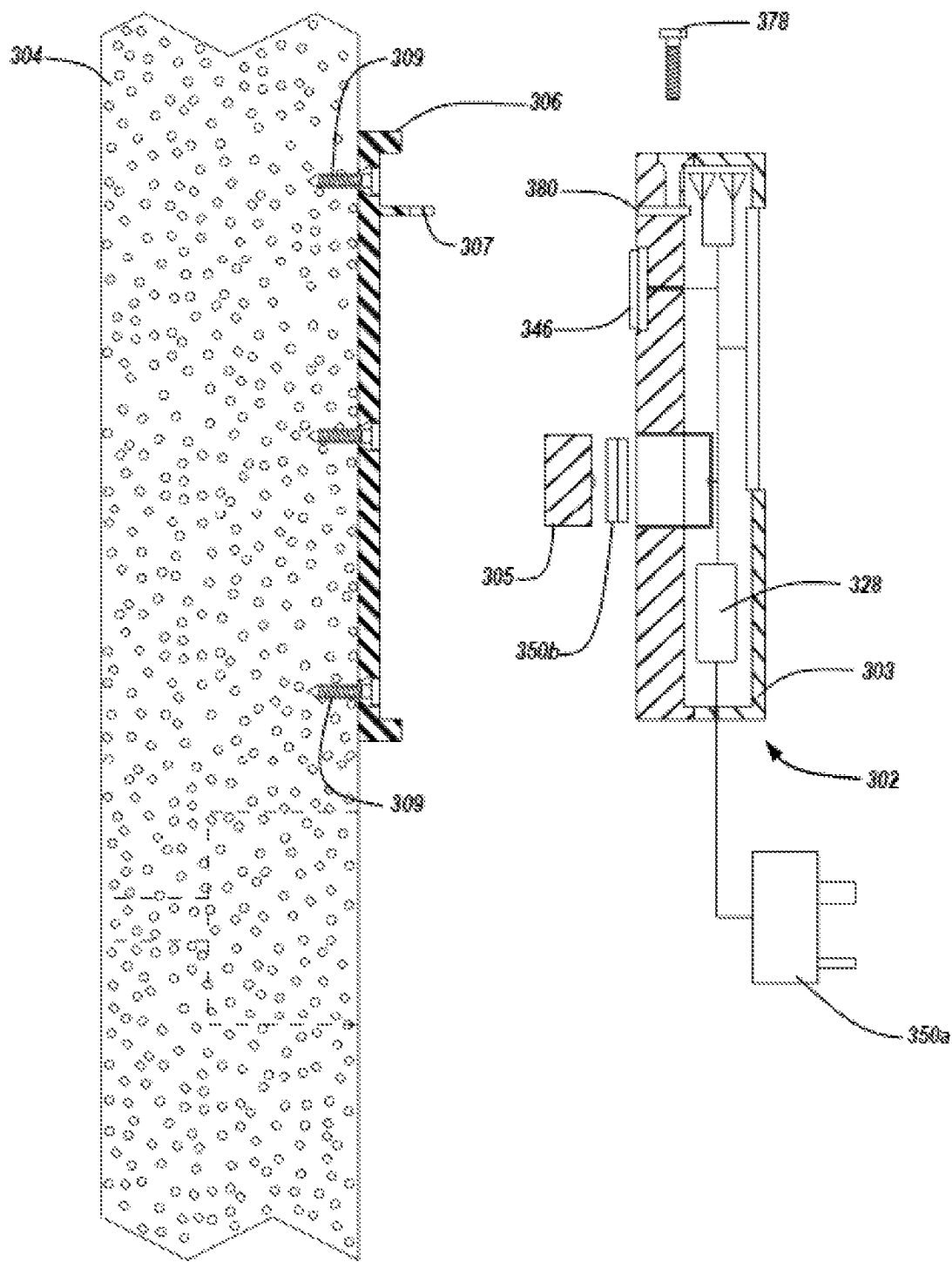

Turning now to FIGS. 3B-3D, embodiments of the control panel 302 are illustrated in additional detail to illustrate a manner in which the control panel 302 may be removed from the wall 304. Removal may occur to replace a defective device, replace the device with an updated model, to replace a component (e.g., DC power supply 350b), when service is discontinued, or for any number of other purposes. Potentially anyone may remove the control panel 302; however, in some embodiments the removal may trigger certain events that are reported to a NOC, monitoring service, a customer service center, or other remote location. In some embodiments, monitoring may potentially detect when a customer is replacing the control panel with a competitive system, even if the customer has not notified the current service provider of the change.

As discussed herein, a rear surface of the body 303 of the control panel 302 may be secured to a frontal surface of the mounting plate 306. The control panel 302 may optionally include a sensor 346 that detects when installation is performed. The sensor 346 may, for instance, include a mechanical switch or button that can be depressed against the frontal surface of the mounting plate 306. A depressed state may indicate the control panel 302 is installed, while an un-depressed state may indicate the control panel 302 is detached from the mounting plate 306. While the sensor 346 may include a mechanical switch or sensor, the sensor 346 may operate in other manners. For instance, the sensor 346 may include a magnetic switch using magnetic fields to determine when the control panel 302 is attached or detached relative to the mounting plate 306. Other types of sensors may include proximity sensors, inductive sensors, capacitive sensors, photoelectrical sensors, or any other sensor. A sensor or switch combining any of the foregoing may also be used.

The control panel 302 may be secured to the mounting plate 306 in any number of manners. Mechanical fasteners, adhesives, other components, or any combination thereof, may secure the control panel 302 in place. For instance, in one embodiment the mounting plate 306 and/or body 303 of the control panel 302 may create a frictional or interference fit, or a so-called "snap-fit," that temporarily locks the control panel 302 to the mounting plate 306. In at least one embodiment, a mechanical fastener may be used.

For instance, FIG. 3B illustrates a screw 378 that has optionally been removed from the body 303 of the control panel 302. Once the screw 378 is removed, the control panel 302 may potentially be removed from the mounting plate 306, as shown in FIG. 3C. In particular, in this embodiment, the mounting plate 306 may include, or be attached to, a connector 307 that cooperates with a slot 380 or other feature of the body 303 of the control panel 302. In FIG. 3B, the connector 307 is shown as being located within the slot 380. As best seen in FIG. 3A, when the screw 378 is secured to the control panel 302, the screw 378 may also pass through, or otherwise connect to, the connector 307, thereby securing the control panel 302 to the mounting plate 306. As shown in FIG. 3C, however, once the screw 378 is removed, the connector 307 may be removed from the slot 380 and the control panel 302 can be removed from the mounting plate 306. Upon such removal, the sensor 346 may expand from a previously depressed state, thereby indicating the control panel 302 has been removed. In some embodiments, and as discussed in more detail herein, the sensor 346 may be monitored (e.g., by controller 328). Upon removal of the control panel 302, the controller 328 may send a signal (e.g., using an antenna) to a remote location, or may take some action entirely on its own.

In order to send a signal, or to power the controller 328 and/or sensor 346, the control panel 302 may maintain some type of power supply available. As shown in FIG. 3B, the AC power supply 350a may be disconnected in some embodiments. Such a disconnection may occur prior to removal of the screw 378 and/or detachment of the control panel 302 from the mounting plate 306, although in other embodiments, the AC power supply 350a may be disconnected afterwards. If the AC power supply 350a is disconnected prior to the removal of the control panel 302 from the mounting plate 306, the DC power supply 350b may continue to supply power to some or all components. If the AC power supply 350a provides primary power to the control panel 302, the controller 328 may include, or be connected to, a sensor that detects when the AC power supply 350a is no longer providing power in order to make the transition to DC power. In at least some embodiments, the DC power supply 350b may provide sufficient voltage to power the sensor 346, controller 328, and one or more antennas 342, 344. Consequently, even when AC power is unavailable, the presence of DC power may allow the control panel 302 to process a signal and send it to a NOC or other remote location for evaluation.

According to at least some embodiments, the DC power supply 350b may also be removable or otherwise disconnected from the control panel 302. In FIG. 3D, for instance, the body 303 of the control panel 302 may include a removable door 305 that provides access to the DC power supply 350b. In this particular embodiment, the removable door 305 may be located on a rear surface of the body 303. In such an embodiment, the control panel 302 may need to be removed from the mounting plate 306 before the DC power supply 350b can be removed and/or replaced. By locating the removable door 305 or other mechanism for allowing removal of the DC power supply 350b in this manner, the DC power supply 350b may be available for use any time the control panel 302 is removed from the mounting plate 306. More particularly, to access the removable door 305, the control panel 302 is optionally required to be first removed from the mounting plate 306, which can then allow the sensor 346 to detect removal and allow sending of a signal relating thereto before a user or other entity has a chance to remove the DC power supply 350b.

By allowing a signal to be sent before the DC power supply 350b is removed, the control panel 302 may be protected against various types of actions. For instance, an intruder may attempt to enter a location and damage or remove the control panel 302 in order to disable an alarm. However, even if the intruder was to disconnect the AC power supply 350a and remove the control panel 302, a notification may be transmitted before the intruder may be able to remove the DC power supply 350b.

In another aspect, an owner of a location monitored using the control panel 302 with an automation system may decide to discontinue automation services. Typically, such an owner may remove the automation system equipment, including the control panel 302, and dispose of the equipment. If the user removes the control panel 302, a signal may be sent to a NOC or other location. That location may then contact the owner to attempt to recover the control panel 302 and recoup some costs associated with the automation system.

In still another embodiment, a user may decide to switch to an alternative automation system and provider. The user or other provider may unplug and remove the control panel 302. Upon doing so, however, the control panel 302 may continue to have power available through the DC power supply 350*b*, and detect the removal of the control panel, and send a notification of the removal to a NOC or other location. In one embodiment, the NOC or other remote service provider may contact the customer directly. A customer service representative may, for instance, be provided with information about the removal and can immediately call the customer to inquire about the removed panel. Upon determining the user is considering switching to an alternative automation system and provider, the customer service representative may enter in a dialog intended to retain the customer.

Yet another aspect of the embodiment in FIGS. 3A-3D may be the ability to restrict collective removal of the control panel 302 and mounting plate 306 from the wall 304. In particular, FIGS. 3A-3D illustrate a sensor 346 that may detect when the control panel 302 is removed from the mounting plate 306. In an attempt to circumvent such a system, a person could potentially attempt to remove the mounting plate 306 from the wall 304 directly, without first removing the control panel 302. As shown in FIGS. 3B-3D, the mounting plate 306 is optionally secured to the wall 304 using one or more screws 309, although any other suitable mechanical or other fastener may be used. In at least some embodiments, the screws 309 are secured at a location covered by the control panel 302 (see FIG. 3B). Only after removing the control panel 302 may a person potentially access the screws 309 to remove them, and thus remove the mounting plate 306.

The various aspects of the embodiment of a control panel 302 in FIGS. 3A-3D are illustrative, and should not be interpreted as being required in all embodiments. Moreover, while certain features are described or illustrated in one manner, they may be provided in other manners as well. For instance, FIGS. 3A-3D illustrate a removable door 305 on the rear surface of the control panel 302. In other embodiments, the removable door 305 or other mechanism for allowing removal of the DC power supply 350*b* may be located in other locations. For instance, the removable door 305 may be located on a front surface or top or bottom surface the control panel 302. Although not necessary for all embodiments, an alternative location may, in some embodiments, continue to allow the DC power supply 350*b* to be removed only after removal of the control panel 302 from the mounting plate 306, or after disconnection of the AC power supply 350*a*. For instance, the removable door 305 may include a lock or other feature that is activated as long as the AC power supply 350*a* is active. Thus, a user may be unable to remove the removable door 305 until first disconnecting the AC power supply 350*a*. Removal of the control panel 302 from the mounting plate 306 may also be required to occur prior to disconnection of the AC power supply 350*a*. In such an embodiment, even in the control panel 302 is removed, and the AC power supply 350*a* also removed very quickly thereafter, the DC power supply 350*b* may continue to provide power for enough time to allow the sensor 346 to detect removal of the control panel 302 and/or the AC power supply 350*a*, and to send a signal to a NOC, central monitoring service, or other location.

In another embodiment, the control panel 302 and the mounting plate 306 may be connected in other manners. As discussed herein, the illustrated embodiment illustrates a connector 307 and slot 380. A screw 378 may pass through the control panel 302 and connect to the connector 307 to secure the control panel 302 to the mounting plate 306. In other embodiments, however, the screw 378 may be entirely omitted and replaced with other components, including other mechanical fasteners, or interlock features. In another embodiment, the connector 307 may be located on the control panel 302 and mate with a corresponding slot or other feature of the mounting plate 306.

As discussed herein, embodiments of the present disclosure relate to detecting removal of a control panel. Upon detecting removal of the control panel, actions may be taken to recover equipment, mitigate losses, retain customers, or for other reasons. The control panel may also be configured to assist or implement the process.

Figure 4:
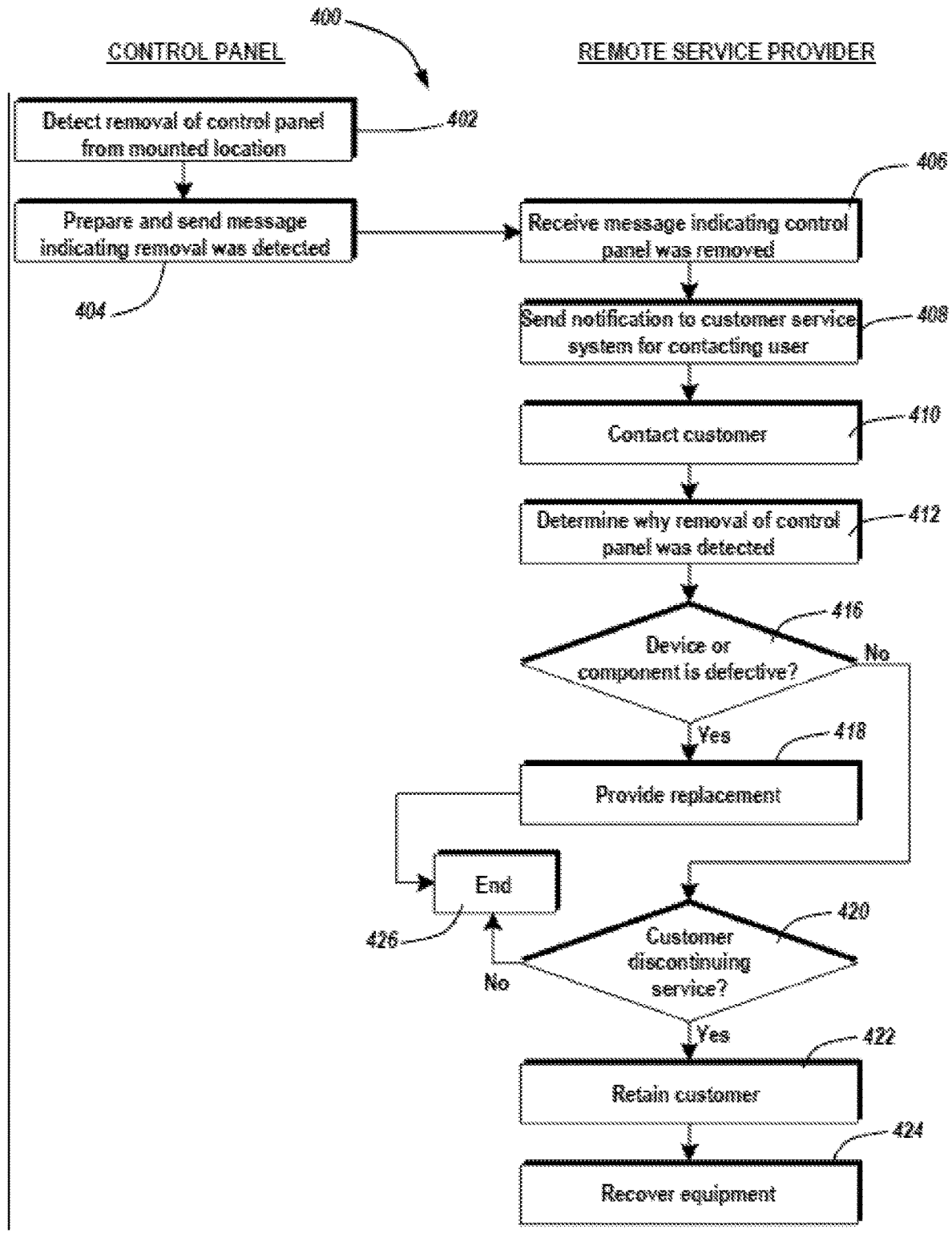
FIG. 4 illustrates an exemplary method for monitoring removal of a control panel and notifying a service system of removal of the control panel, in accordance with some embodiments of the present disclosure.
Figure 5:
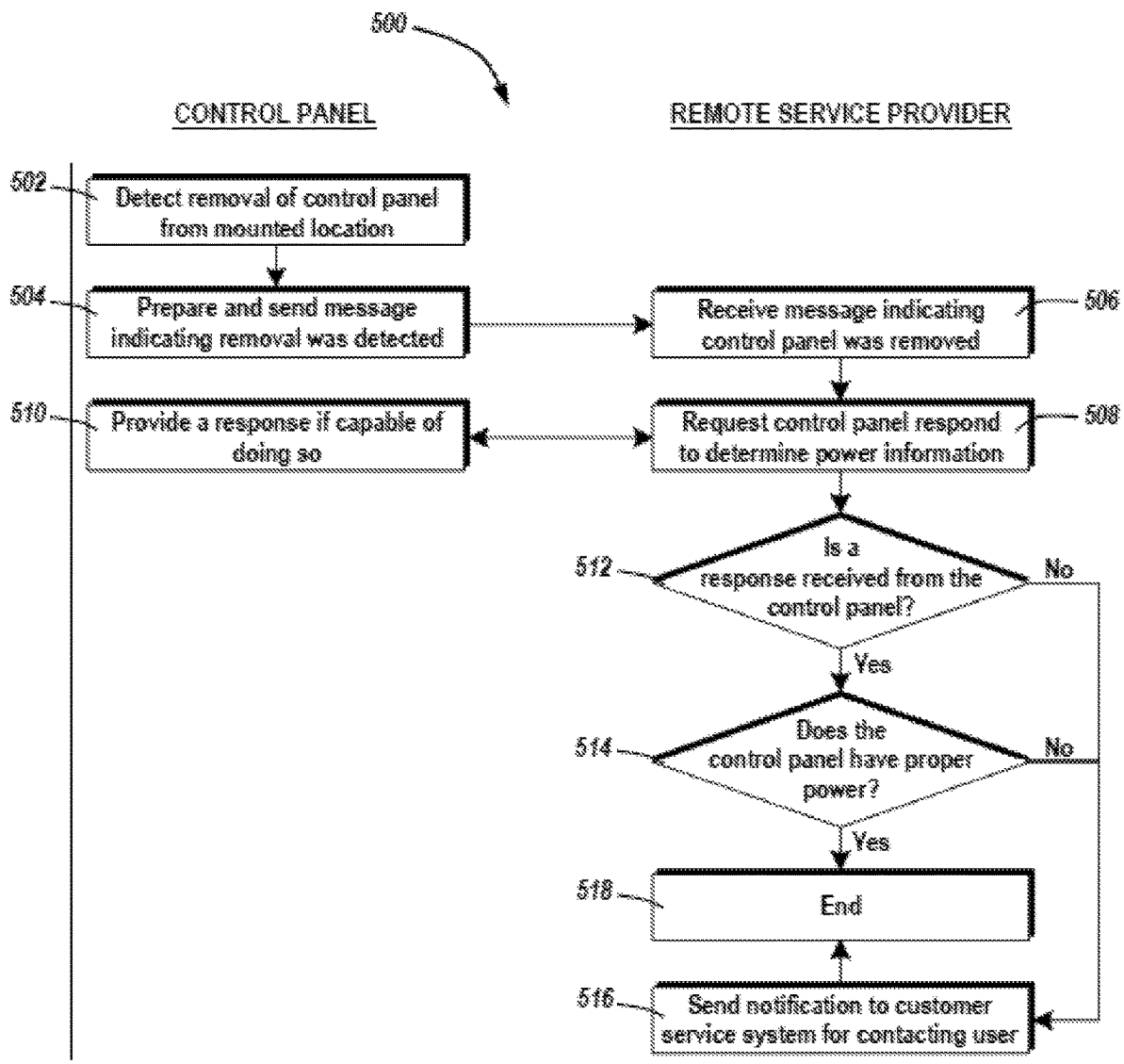
FIG. 5 illustrates an exemplary method for monitoring removal of a control panel, and includes monitoring loss of power, in accordance with some embodiments of the present disclosure.
Figure 6:
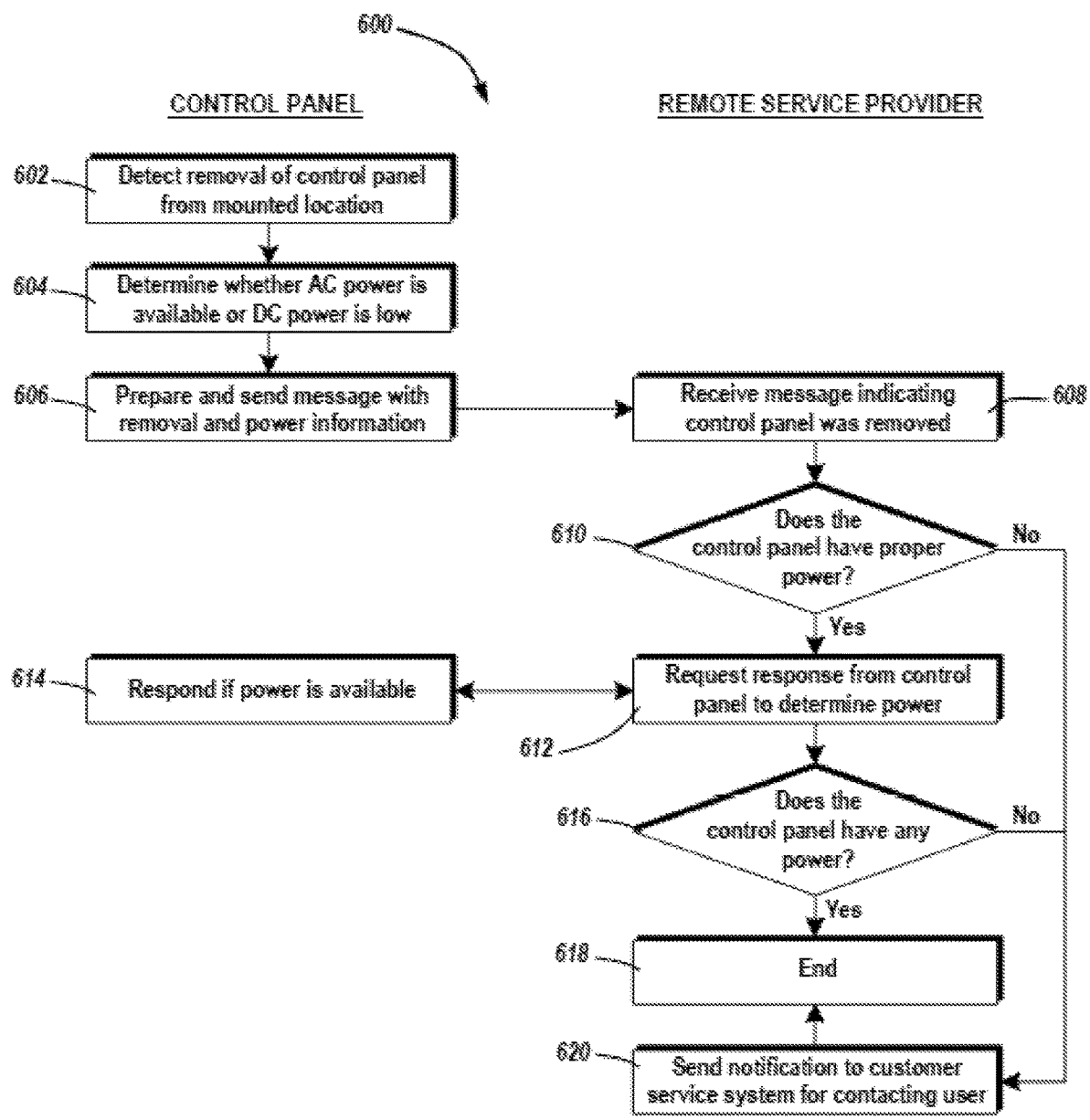
FIG. 6 illustrates an exemplary method for monitoring removal of a control panel and notifying a service system of removal, according to another embodiment of the present disclosure.

Referring now to FIGS. 4-6, some example methods are described for responding to removal of a control panel from a mounted location. The methods of FIGS. 4-6 may be implemented using control panels described herein (e.g., control panels 102*a*-102*n*, 202 and 302 of FIGS. 1-3D), as well as by using other systems or equipment (e.g., NOC 120 or monitoring system 121 of FIG. 1). Each method is illustrative only, and may include additional or fewer acts in some embodiments. Accordingly, the methods of FIGS. 4-6 may include elements which are interchangeable and/or which may be used in any combination with other steps, acts or methods in which a control panel is removed, replaced, damaged, installed, or recovered.

To allow a better understanding of the methods of FIGS. 4-6, such methods will be described in connection with the control panel 302 of FIGS. 3A-3D. Such a description merely provides one embodiment of how methods may be implemented, and is not intended to limit the methods of FIGS. 4-6 to any particular embodiment or system.

With reference to FIG. 4, a method 400 for responding to removal of a control panel is described and illustrated. For the method 400 of FIG. 4, a control panel of an automation system may be mounted on a wall or otherwise secured at a particular location. The control panel may be monitored and removal of the control panel may be detected in act 402. In the context of the embodiment of a control panel 302 shown in FIGS. 3A-3D, detecting removal may include using a sensor (e.g., sensor 346) that determines when the control panel 302 is removed from a mounting plate, wall, or other surface. A mechanical, magnetic, inductive, capacitive, photoelectrical, proximity, or other sensor, or some combination of the foregoing, may facilitate such a determination by detecting removal of the control panel.

When removal of the control panel is detected in act 402, the control panel may prepare and send a message or other signal indicating removal was detected (act 404). In some embodiments, preparing and sending the message may be accomplished using a wireless antenna that sends a signal over a mesh network, WiFi network, mobile network, or other wireless network. In other embodiments, the signal may be sent in other manners, including through a wired connection, or through a long-range wireless network.

Regardless of how the signal or message is sent, the message may be directed to a remote location. In at least some embodiments, the remote location may include a NOC, a monitoring system, or another remote service provider system. Such a system may include one or more computing devices, including servers, back-end systems, and the like. The signal may be conveyed in an electronic form that is received by the remote service provider in act 406. In receiving the message, the remote service provider may interpret the message and determine that the message indicates the control panel was removed. In response, the remote service provider may send a notification to a customer service system (act 408). Such a system may allow a customer service representative or system to contact the customer (act 410). Upon contacting the customer in act 410, the service representative may inquire about the removal to determine why a signal was received indicating the control panel was removed (act 412).

The signal may have been received for any number of reasons. For instance, an anti-tamper switch, sensor, or other component responsible for detecting removal of the control panel may be defective, which could result in a false alarm. The user may have also removed the control panel to replace a defective or depleted battery, or because the control panel itself stopped performing one or more functions. In any such case, the customer service representative or center may determine whether the device or component is defective (act 416). Optionally, if a component is defective, a replacement may be provided in act 418. Providing a replacement may include ordering a replacement to be sent to the customer, scheduling a service call to see if repair or replacement is available, or the like.

If the device or component was not defective, a determination may also be made as to whether the customer is discontinuing service (act 420). If the customer is going to stop using the service altogether, or will be switching to an alternative service, the customer service representative or system may take actions to retain the customer (act 422). Such actions may include offering discounts or upgraded equipment, describing short fallings of a competitive system, or other actions. If an upgrade is to be provided, or if unable to retain the customer, the customer service center may recover equipment from the consumer (act 424). To recover equipment, a service call may be scheduled to allow recovery of the control panel. As described herein, some embodiments contemplate using automation components that are encrypted or otherwise secured. Such components may be unusable with a competitor's system, and may thus also be recovered in act 424 in addition to, or instead of, the control panel.

In some embodiments, detecting removal of the control panel may occur in isolation to trigger a response from a remote service provider, although other embodiments may contemplate making other automatic or automated inquiries prior to potentially requesting a customer be contacted. FIG. 5, for instance, illustrates an example method 500 for responding to removal of a control panel by also attempting to determine whether power remains available to the control panel. Certain aspects of the method 500 may be similar to acts or components of the method 400 of FIG. 4, which can therefore be incorporated into the method 500.

In FIG. 5, an act 502 may include detecting removal of a control panel from a mounted location. As noted herein, this may be done in any number of forms, including by an automated fashion using an anti-tamper switch, or another component or sensor. In response, the control panel (that is detected as having been removed), or another component in the automation system, may prepare and send a message or signal to indicate removal of the control panel was detected (act 504). In at least one embodiment, the message or signal may be sent to a remote system.

An example message may be provided as an electronic communication signal or message and provided to one or more computing systems as part of a NOC, monitoring system, or other remote service provider. Regardless of the particular type of remote service provider, the message may be received in act 506. Receipt of the message may include interpreting the message to determine the control panel was removed.

After the message is received in act 506, the remote service provider may attempt to continue communication with the control panel in act 508. This messaging may take any number of forms. For instance, in one embodiment, the remote service provider may request the control panel to provide information on its power state, including whether or not AC power, DC power, or another power supply has been cut-off. If, for instance, AC power has been cut-off, but DC power is still available, the control panel can receive the message and send a response back in act 510 to indicate AC power was lost. A ping message may also or alternatively be sent in act 508 to see if any response can be received from the control panel.

In act 512, the method 500 may continue to determine whether a response was received from the control panel in response to the request of act 508. If a response was received, the control panel may be assumed not dead, and has at least some power available. Consequently, a determination may be made to determine whether the control panel lost AC power (act 514). If the control panel does not have AC power, the method 500 may assume the control panel has been removed for repair, replacement, or due to discontinued use. Consequently, at act 516, the method may send a notification to a customer service system to request that the customer be contacted. The customer service system may then contact the customer to determine the precise reason why the control panel was removed. In one example, the customer service system, which may be the same as, or different than, the remote service provider, may take action to determine if a device was defective, if there was a false alarm, if service is being discontinued, if an alternative system is being installed, or the like. Acts similar to, or potentially including, acts 410-424 of FIG. 4 may be used by the customer service system to make such determinations.

In some embodiments, the remote service provider may limit contact from some customer service representatives to circumstances when it is reasonable to assume that disconnection has occurred for replacement purposes. For instance, if a control panel is removed but continues to be powered by an AC power source, it may be assumed that the device is not being replaced. As a result, if act 514 determines power remains available, the method 500 may end without notifying the customer service system and requesting that they contact the customer.

In some embodiments, the requesting of power information in acts 508, 510, determining whether a response is received in act 512, and determining whether AC power is available to the control panel in act 514 may be repeated one or more times, and potentially repeatedly over a predetermined or other delay period. More particularly, as long as AC power remains available, the method 500 may include continuing to request and potentially receive information. Upon loss of communication, or loss of AC power at the control panel, the method may then move to act 516 of notifying the customer service system. Repetition of acts 508-514 may also be terminated in other manners. For instance, if the control panel sends a signal indicating it has been reconnected, the remote service provider may, but does not necessarily, terminate the method 500.

If acts 508-514 continue to repeat over an extended period of time, the method 500 may also end in act 518, but possibly may also result in a notification to a customer service system. Continued AC power, but a detached control panel may not indicate a replacement system is being installed, but may indicate a potentially defective component or other problem with the control panel. Optionally, a customer service system, or set of available customer service representatives, may contact a user when there is an assumed defect or other problem, but such a system or representatives may be different as compared to a representative or system used for retention when the assumption is that the control panel is being replaced (e.g., when the control panel is removed and AC or DC power is cut-off). In other embodiments, the same customer service system or representatives may be notified, but provided different information.

In embodiments where there is a delay before notifying the customer service system, the length of the delay may vary. As noted above, the delay may be shortened if it is determined that AC power is lost, that there is no signal, indicating that the control panel is potentially being replaced, or if the control panel is reconnected. In other embodiments, the full delay may be used. That delay may be up to approximately two hours in some embodiments. In a more particular embodiment, the status of the control panel may be monitored over a period up to approximately one hour, or up to approximately thirty minutes. In still another embodiment, status of a control panel may be monitored for up to approximately ten minutes. Of course, in other embodiments, the delay or time period during which monitoring continues may be longer than approximately two hours.

One aspect of the method 500 of FIG. 5 is the ability to contact a customer quickly in the event of a potential problem, or at a time when an alternative system is contemplated. Accordingly, some embodiments of the present disclosure also contemplate the method 500 being fully performed in potentially less than approximately thirty minutes, less than approximately fifteen minutes, or even less than approximately ten minutes. In such embodiments, a delay before notifying a customer service system may be shortened (e.g., be less than approximately ten minutes, less than approximately five minutes, less than approximately two minutes, etc.). If, for instance, a replacement is being installed, this may allow the representative to call right at the time the replacement is installed to potentially retain the customer. Contacting the customer after a replacement has been installed may be far less effective for retaining the customer than getting in touch with the customer before the replacement is complete.

While the method 500 includes use of a remote service provider to request information (e.g., information about AC power), other embodiments contemplate the control panel detecting and providing information about AC power even absent a request. FIG. 6, for instance, illustrates a method 600 in which a control panel may be monitored, and its removal from a mounted location detected (act 602). Optionally, when removal is detected, the control panel 600 may determine whether or not AC power has also been cut-off (act 604). Optionally, the act 604 may be repeated over a period of time to continuously monitor the AC power supply.

Upon determining the status of the AC power supply in act 604, the control panel can prepare and send a message or signal to indicate the control panel has been removed, and whether or not AC power is still available (act 606). This message may take a number of forms, and can be an electronic message communicated over a wired or wireless communication system, or a combination thereof, as discussed herein. In some embodiments, the message may take the form of two or more messages that collectively describe the power and/or removal status of the control panel.

The messages about removal of the control panel and/or the status of AC power of the control panel may be received by a remote service provider in act 608. Such a remove service provider may include a NOC or monitoring system, either of which may optionally provide a back-end system for administering an automation system connected to the control panel. Upon receipt of the message in act 608, the remote service provider may determine whether the control panel has AC power in act 610. If there is not AC power, which may lead to an assumption that the control panel is being replaced, the method may include sending a notification to a customer service system to allow them to contact the customer and determine what is happening (act 620). As discussed herein, the customer service system may take any number of courses of action to determine if the control panel, or its components, is defective, if the system is indeed being replaced, if the user is discontinuing service, or the like.

If the control panel has not lost AC power, as determined in act 610, the method 600 may perform other actions prior to performing act 620. In one embodiment, the method 600 may instead include the remote service provider attempting to again communicate with the control panel to determine the power available to the control panel (act 612). If the control panel has power, it may respond in act 614. The request in act 612 may be a ping message to determine if there is power at the control panel, which may be indicated by a response. The request in act 612 may also be more detailed, and may request power information (e.g., whether AC power is available). Consequently, the response in act 614 may include more detail than a simple response to a ping message.

When a response is received, method 600 may include the remote service provider determining whether the control panel has power (act 616). This may include, in some embodiments, determining whether the control panel 616 has any power at all, or what type of power is available. For instance, if no response is received to the request in act 612, it can be assumed there is no power at all and the control panel is dead. That may result in sending a notification to the customer service system in act 620 to request contact with the customer, and determine if there is a problem with the system, whether a replacement is being considered, or if something else is occurring. Similarly, a response is provided in act 614, but the response indicates AC power has been lost, the determination in act 616 may also lead to the customer service system being notified in act 620. If, however, AC power continues to be available, the method 618 may end. In some embodiments, if AC power continues at the control panel, the acts 612-616 of the method 600 may repeat over a period of time. Upon expiration of that time period, the method 600 may end in act 618. Alternatively, prolonged periods where AC power is available, but the control panel indicates it is not secured to the mounted location, may indicate another problem and a customer service system can be alerted.

In view of the above description, it should be appreciated that systems, control panels, devices, and methods of the present disclosure may allow for detection of problems with a control panel and/or detection of a control panel that is being replaced with a competitive system, or simply discontinued. By monitoring whether the control panel is mounted, and potentially the status of the power supplies to the control panel, the systems, devices, and methods may detect such events and respond. An example response may include triggering a notification at a customer service center. In response to the notification, a customer service representative may call or otherwise contact the customer to determine what is happening and see why the control panel is showing a loss of power and/or disconnection from the mounted location. Such a call may be made manually, or may be auto-dialed for the customer service representative.

When the call is made, a problem may be remedied in a timely manner. For instance, if there is a problem with the system, replacements components may be ordered or sent and/or a service call may be scheduled. If the system is being replaced with a competitor's system, a retention specialist may attempt to retain the customer. As such retention can potentially occur nearly immediately following removal of a control panel, and before installation of a competitive system, the likelihood of retaining a customer can be significantly increased.

Embodiments of the present disclosure may comprise or utilize a special purpose or general-purpose computer including computer hardware, such as, for example, one or more processors and system memory in a control panel for an automation system, a server or computing device of a network operations center or monitoring system, or in other systems or components. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media. Computer-readable media that carry computer-executable instructions are transmission media. Thus, by way of example, and not limitation, embodiments of the disclosure can comprise at least two distinctly different kinds of computer-readable media, including at least computer storage media and/or transmission media. Computer-readable media that includes computer-executable instructions may also be referred to as a computer program product.

Examples of computer storage media include RAM, ROM, EEPROM, CD-ROM or other optical disk storage, magnetic disk storage or other magnetic storage devices, flash-based storage, solid-state storage, or any other physical, non-transmission medium which can store desired program code means in the form of computer-executable instructions or data structures and which can be accessed by a general purpose or special purpose computer.

When information is transferred or provided over a communication network or another communications connection (either hardwired, wireless, or a combination of hardwired or wireless) to a computing device, the computing device properly views the connection as a transmission medium. A "communication network" may generally be defined as one or more data links that enable the transport of electronic data between computer systems and/or modules, engines, and/or other electronic devices, and transmissions media can include a communication network and/or data links, carrier waves, wireless signals, and the like, which can carry desired program or template code means or instructions in the form of computer-executable instructions or data structures within, to or from a communication network. Combinations of storage media and transmission media should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise instructions and data which, when executed at a processor, cause a general purpose computer, dedicated or special purpose computer (e.g., an automation system control panel), or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above, nor performance of the described acts or steps by the components described above. Rather, the described features and acts are disclosed as example forms of implementing the claims.

Those skilled in the art will appreciate that the embodiments may be practiced in network computing environments with many types of computer system configurations, including, personal computers, desktop computers, laptop computers, message processors, hand-held devices, programmable logic machines, multi-processor systems, microprocessor-based or programmable consumer electronics, network PCs, tablet computing devices, minicomputers, automation system control panels, network operations centers, mainframe computers, mobile telephones, PDAs, pagers, routers, switches, and the like.

Embodiments may also be practiced in distributed system environments where local and remote computer systems, which are linked (either by hardwired data links, wireless data links, or by a combination of hardwired and wireless data links) through a network, both perform tasks. In a distributed computing environment, program modules may be located in both local and remote memory storage devices.

Those skilled in the art will also appreciate that embodiments of the present disclosure may be practiced in special-purpose, dedicated or other computing devices integrated within or particular to a particular residence, business, company, government agency, or other entity, and that such devices may operate using one or more network, wireless, hardwire, or other connections, or any combination thereof. Examples may include residential or commercial buildings in connection with security or other automation systems configured to monitor local conditions (i.e., within a specific range of the building), remote conditions (i.e., accessible regardless whether within a particular range), or some combination thereof.

Although the foregoing description contains many specifics, these should not be construed as limiting the scope of the disclosure or of any of the appended claims, but merely as providing information pertinent to some specific embodiments that may fall within the scopes of the disclosure and the appended claims. Various embodiments are described, some of which incorporate differing features. Any feature illustrated or described relative to one embodiment is interchangeable and/or may be employed in combination with features of any other embodiment herein. In addition, other embodiments may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed is:

1. A method for an automation system, comprising:
determining a tampering event associated with a control panel, the tampering event comprising a removal of the control panel from a fixed location;
triggering a default delay period for notifying a service representative of a service provider associated with the control panel of the tampering event in response to detecting removal of the control panel from the fixed location, the default delay period having a temporal duration based at least in part on the tampering event;
determining a power loss event associated with an alternating current (AC) power supply of a plurality of power supplies of the control panel;
shortening the default delay period by reducing the temporal duration based at least in part on the power loss event;
establishing a communication session with the service provider associated with the control panel, wherein the communication session is powered by a backup direct current (DC) power supply of the plurality of power supplies of the control panel;
determining, during the communication session, that the control panel has a defective component and that removal of the control panel from the fixed location is associated with the defective component; and
transmitting, in response to expiration of the shortened delay period, a request for the service representative of the service provider to contact a customer associated with the control panel, the request intended for a service representative that handles replacement of defective component of the control panel.

2. The method of claim 1, wherein determining the tampering event comprises:
receiving sensor data from a tampering sensor; and
determining the removal of the control panel from the fixed location based at least in part on the sensor data.

3. The method of claim 1, further comprising:
receiving sensor data from a power supply sensor, wherein determining the power loss event associated with the AC power supply of the control panel is further based at least in part on the sensor data from the power supply sensor.

4. The method of claim 1, further comprising:
receiving sensor data from a power supply sensor; and
determining continued access to the DC power supply during the shortened delay period based at least in part on the sensor data from the power supply sensor,
wherein establishing the communication session with the service provider associated with the control panel is based at least in part on the continued access to the DC power supply.

5. The method of claim 1, further comprising:
receiving, from the service provider, a ping request message in response to the power loss event associated with the AC power supply of the control panel; and
transmitting, to the service provider, a ping response message, wherein establishing the communication session with the service provider is further based at least in part on the ping request message and the ping response message.

6. The method of claim 5, wherein the transmission of the ping response message is powered by the DC power supply of the control panel.

7. The method of claim 1, further comprising:
receiving sensor data from a power supply sensor;
determining a power connect event associated with the AC power supply of the control panel based at least in part on the sensor data, the power connect event indicating that the control panel has access to the AC power supply;
determining that the power connect event occurs prior to the shortened delay period lapsing; and
refraining from transmitting the request based at least in part on the power connect event occurring prior to the shortened delay period lapsing.

8. The method of claim 1, wherein the request comprises one or more of ordering a replacement to be sent to the customer and scheduling a service call.

9. A control panel, comprising:
a processor;
an alternating current (AC) power supply; a direct current (DC) power supply;
memory in electronic communication with the processor, and instructions stored in the memory and executable by the processor to cause the control panel to:
determine a tampering event associated with the control panel, the tampering event comprising a removal of the control panel from a fixed location;
trigger a default delay period to notify a service representative of a service provider associated with the control panel of the tampering event in response to detecting removal of the control panel from the fixed location, the default delay period having a temporal duration based at least in part on the tampering event;
determine a power loss event associated with the AC power supply of a plurality of power supplies of the control panel;
shorten the default delay period by reducing the temporal duration based at least in part on the power loss event;
establish a communication session with the service provider associated with the control panel, wherein the communication session is powered by the DC power supply of the plurality of power supplies of the control panel; and
determine, during the communication session, that the control panel has a defective component and that removal of the control panel from the fixed location is associated with the defective component; and
transmit, in response to expiration of the shortened delay period, a request for the service representative of the service provider to contact a customer associated with the control panel, the request intended for a service representative that handles replacement of the defective component of the control panel.

10. The control panel of claim 9, wherein the instructions to determine the tampering event are further executable by the processor to cause the control panel to:
receive sensor data from a tampering sensor; and
determine the removal of the control panel from the fixed location based at least in part on the sensor data.

11. The control panel of claim 9, wherein the instructions are further executable by the processor to cause the control panel to:
receive sensor data from a power supply sensor, wherein determining the power loss event associated with the AC power supply of the control panel is further based at least in part on the sensor data from the power supply sensor.

12. The control panel of claim 9, wherein the instructions are further executable by the processor to cause the control panel to:
receive sensor data from a power supply sensor; and
determine continued access to the DC power supply during the shortened delay period based at least in part on the sensor data from the power supply sensor,
wherein establishing the communication session with the service provider associated with the control panel is based at least in part on the continued access to the DC power supply.

13. The control panel of claim 9, wherein the instructions are further executable by the processor to cause the control panel to:
receive, from the service provider, a ping request message in response to the power loss event associated with the AC power supply of the control panel; and
transmit, to the service provider, a ping response message, wherein establishing the communication session with the service provider is further based at least in part on the ping request message and the ping response message.

14. The control panel of claim 13, wherein the transmission of the ping response message is powered by the DC power supply of the control panel.

15. The control panel of claim 9, wherein the instructions are further executable by the processor to cause the control panel to:
receive sensor data from a power supply sensor;
determine a power connect event associated with the AC power supply of the control panel based at least in part on the sensor data, the power connect event indicating that the control panel has access to the AC power supply;
determine that the power connect event occurs prior to the shortened delay period lapsing; and
refrain from transmitting the request based at least in part on the power connect event occurring prior to the shortened delay period lapsing.

16. The control panel of claim 9, wherein the request comprises one or more of ordering a replacement to be sent to the customer and scheduling a service call.

17. A non-transitory computer-readable medium storing code for an automation system, the code comprising instructions executable by a processor to cause a control panel to:
determine a tampering event associated with the control panel, the tampering event comprising a removal of the control panel from a fixed location;
trigger a default delay period to notify a service representative of a service provider associated with the control panel of the tampering event in response to detecting removal of the control panel from the fixed location, the default delay period having a temporal duration based at least in part on the tampering event;
determine a power loss event associated with an alternating current (AC) power supply of a plurality of power supplies of the control panel;
shorten the default delay period by reducing the temporal duration based at least in part on the power loss event;
establish a communication session with the service provider associated with the control panel, wherein the communication session is powered by a direct current (DC) power supply of the plurality of power supplies of the control panel;
determine, during the communication session, that the control panel has a defective component and removal of the control panel from the fixed location is associated with the defective component; and
transmit, in response to expiration of the shortened delay period, a request for the service representative of the service provider to contact a customer associated with the control panel, the request intended for a service representative that handles replacement of the defective component of the control panel.

18. The non-transitory computer-readable medium of claim 17, wherein the instructions to determine the tampering event are further executable by the processor to cause the control panel to:
receive sensor data from a tampering sensor; and
determine the removal of the control panel from the fixed location based at least in part on the sensor data.

19. The non-transitory computer-readable medium of claim 17, wherein the instructions are further executable by the processor to cause the control panel to:
receive sensor data from a power supply sensor,
wherein determining the power loss event associated with the AC power supply of the control panel is further based at least in part on the sensor data from the power supply sensor.

20. The non-transitory computer-readable medium of claim 17, wherein the instructions are further executable by the processor to cause the control panel to:
receive sensor data from a power supply sensor;
determine a power connect event associated with the AC power supply of the control panel based at least in part on the sensor data, the power connect event indicating that the control panel has access to the AC power supply;
determine that the power connect event occurs prior to the shortened delay period lapsing; and
refrain from transmitting the request based at least in part on the power connect event occurring prior to the shortened delay period lapsing.

* * * * *